US 012394829B2

(12) United States Patent
Aoki et al.

(10) Patent No.: US 12,394,829 B2
(45) Date of Patent: Aug. 19, 2025

(54) BATTERY PACK

(71) Applicant: MAKITA CORPORATION, Anjo (JP)

(72) Inventors: Yonosuke Aoki, Anjo (JP); Tatsuki Mori, Anjo (JP)

(73) Assignee: MAKITA CORPORATION, Anjo (JP)

( * ) Notice: Subject to any disclaimer, the term of this patent is extended or adjusted under 35 U.S.C. 154(b) by 622 days.

(21) Appl. No.: 17/764,023

(22) PCT Filed: Sep. 24, 2020

(86) PCT No.: PCT/JP2020/036118
§ 371 (c)(1),
(2) Date: Mar. 25, 2022

(87) PCT Pub. No.: WO2021/060404
PCT Pub. Date: Apr. 1, 2021

(65) Prior Publication Data
US 2022/0352559 A1    Nov. 3, 2022

(30) Foreign Application Priority Data

Sep. 26, 2019 (JP) .................................. 2019-175645

(51) Int. Cl.
*H01M 10/42* (2006.01)
*H01M 10/44* (2006.01)
(Continued)

(52) U.S. Cl.
CPC ....... *H01M 10/425* (2013.01); *H01M 10/441* (2013.01); *H01M 50/204* (2021.01);
(Continued)

(58) Field of Classification Search
CPC ............. H01M 10/425; H01M 10/441; H01M 50/204; H01M 50/247; H01M 50/258; H01M 50/296; H01M 2220/30
See application file for complete search history.

(56) References Cited

U.S. PATENT DOCUMENTS

2011/0197389 A1    8/2011 Ota et al.
2014/0377594 A1    12/2014 Suzuki
(Continued)

FOREIGN PATENT DOCUMENTS

EP    3 309 947 A1    4/2018
JP    2011-161602 A    8/2011
(Continued)

OTHER PUBLICATIONS

May 15, 2024 Office Action issued in Chinese Patent Application No. 202080066879.3.
(Continued)

*Primary Examiner* — Milton I Cano
*Assistant Examiner* — Joshua P McClure
(74) *Attorney, Agent, or Firm* — Oliff PLC

(57) ABSTRACT

A battery pack in one aspect of the present disclosure includes two or more battery blocks and a connection circuit. The connection circuit is connected to a positive terminal and a negative terminal of an electric work machine. The connection circuit connects the positive terminal and the negative terminal to a specific number of battery blocks included in the two or more battery blocks. The specific number varies depending on electrical properties of the electric work machine.

8 Claims, 25 Drawing Sheets

(51) Int. Cl.
　　*H01M 50/204*　　(2021.01)
　　*H01M 50/247*　　(2021.01)
　　*H01M 50/258*　　(2021.01)
　　*H01M 50/296*　　(2021.01)

(52) U.S. Cl.
　　CPC ....... *H01M 50/247* (2021.01); *H01M 50/258* (2021.01); *H01M 50/296* (2021.01); *H01M 2220/30* (2013.01)

(56) References Cited

U.S. PATENT DOCUMENTS

| | | | |
|---|---|---|---|
| 2015/0200553 A1* | 7/2015 | Endo | H02J 7/0047 320/134 |
| 2016/0020443 A1 | 1/2016 | White et al. | |
| 2017/0271889 A1* | 9/2017 | Sugeno | H01M 50/213 |
| 2018/0138722 A1 | 5/2018 | Yoon | |
| 2019/0280501 A1 | 9/2019 | Kondo et al. | |
| 2020/0161886 A1 | 5/2020 | Saitoh et al. | |

FOREIGN PATENT DOCUMENTS

| | | | |
|---|---|---|---|
| JP | 2015-6095 A | 1/2015 | |
| JP | 2017-518193 A | 7/2017 | |
| JP | 2018-530305 A | 10/2018 | |
| JP | 6440116 B2 | 12/2018 | |
| WO | 2015/179318 A1 | 11/2015 | |
| WO | 2016/197949 A1 | 12/2016 | |
| WO | 2017/086632 A1 | 5/2017 | |
| WO | 2018/079725 A1 | 5/2018 | |
| WO | WO-2018193730 A1 * | 10/2018 | .......... H01M 10/425 |

OTHER PUBLICATIONS

Nov. 8, 2023 extended Search Report issued in European Patent Application No. 20868169.2.
Nov. 15, 2023 Office Action issued in Chinese Patent Application No. 202080066879.3.
Nov. 24, 2020 International Search Report issued in International Patent Application No. PCT/JP2020/036118.
Nov. 24, 2020 Written Opinion issued in International Patent Application No. PCT/JP2020/036118.

* cited by examiner

BATTERY PACK

CROSS-REFERENCE TO RELATED APPLICATION

This international application claims the benefit of Japanese Patent Application No. 2019-175645 filed on Sep. 26, 2019 with the Japan Patent Office, and the entire disclosure of Japanese Patent Application No. 2019-175645 is incorporated herein by reference.

TECHNICAL FIELD

The present disclosure relates to a battery pack for use in electric work machines.

BACKGROUND ART

A battery pack disclosed in Patent Document 1 below is configured such that an adjustment resistor is connected in series with an original internal resistor, if an original internal resistance value of the battery pack is insufficient for an electric power tool, so that the internal resistance value of the battery pack increases.

PRIOR ART DOCUMENTS

Patent Documents

Patent Document 1: Japanese Patent No. 6440116

SUMMARY OF THE INVENTION

Problems to be Solved by the Invention

However, if the adjustment resistor is connected to the internal resistor of the battery pack, a discharging current flows through the adjustment resistor, and electric power is consumed by the adjustment resistor. Specifically, addition of the adjustment resistor causes loss of electric power.

In one aspect of the present disclosure, it is desirable to be able to provide a battery pack with excellent versatility while reducing loss of electric power.

Means for Solving the Problems

A battery pack in one aspect of the present disclosure includes two or more battery blocks and/or a connection circuit. The connection circuit is connected to a positive terminal and a negative terminal of an electric work machine. The connection circuit connects the positive terminal and the negative terminal to a specific number of battery block(s) included in the two or more battery blocks. The specific number varies depending on electrical properties of the electric work machine.

In this battery pack, the number of battery blocks connected to the positive terminal and the negative terminal of the electric work machine via the connection circuit varies depending on the electrical properties of the electric work machine. Specifically, impedance of the battery pack connected to the electric work machine can be changed in accordance with the electrical properties of the electric work machine. Thus, a battery pack excellent in versatility and with loss of electric power reduced can be implemented.

The specific number may be equal to or smaller than a maximum number of battery blocks permissible depending on the electrical properties.

When the specific number is equal to or smaller than the maximum number, the impedance of the battery pack connected to the electric work machine can be within a range adaptable to the electric work machine.

The two or more battery blocks may each have a positive electrode and a negative electrode. The electric work machine may be configured to transmit machine information that specifies the electrical properties. The connection circuit may include a communication terminal. The communication terminal may receive the machine information from the electric work machine. The battery pack may include a controller. The controller may execute a selection process and/or a conduction process. The selection process includes selecting the specific number of battery blocks from the two or more battery blocks, based on the machine information received by the communication terminal. The conduction process includes: connecting the positive electrode of each of the specific number of battery blocks to the positive terminal via the connection circuit; and/or connecting the negative electrode of each of the specific number of battery blocks to the negative terminal via the connection circuit; and/or disconnecting the positive electrode or the negative electrode of each remaining battery block of the two or more battery blocks from the positive terminal or the negative terminal via the connection circuit.

The machine information can be obtained from the electric work machine via the communication terminal, and the specific number of battery blocks can be selected from the two or more battery blocks based on the obtained machine information. Further, the specific number of battery blocks can be connected to the positive terminal and the negative terminal of the electric work machine, and each remaining battery block can be disconnected from the positive terminal and the negative terminal of the electric work machine.

The controller may further execute a power supply process. The power supply process includes: connecting the positive electrode and the negative electrode of one of the two or more battery blocks to the positive terminal and the negative terminal respectively via the connection circuit until selection of the specific number of battery blocks is completed.

Until selection of the specific number of battery blocks is completed, one battery block is connected to the positive electrode and the negative electrode of the electric work machine. This allows supply of an electric power from the battery pack to the electric work machine while the impedance of the battery pack is highest. Further, the battery pack can obtain the machine information through performing a communication with the electric work machine.

The battery pack may further include a notifier. The controller executes a notification process. The notification process includes: executing a first notification via the notifier in response to the specific number being consistent with a maximum number of battery blocks permissible depending on the electrical properties; and/or executing a second notification via the notifier in response to the specific number being smaller than the maximum number. The second notification is distinct from the first notification.

The first notification is executed in response to supply of an electric power to the electric work machine from the maximum number of battery blocks permissible to the electric work machine. The second notification is executed in response to supply of an electric power to the electric work machine from the battery blocks smaller than the maximum number. This allows a user to recognize whether the electric work machine is operating with a maximum electric power.

The controller may execute a command process. The command process includes: transmitting a first command for execution of the first notification to the electric work machine via the communication terminal in response to the specific number being consistent with a maximum number of battery blocks permissible depending on the electrical properties; and/or transmitting a second command for execution of the second notification, which is distinct from the first notification, to the electric work machine via the communication terminal in response to the specific number being smaller than the maximum number.

In response to supply of an electric power to the electric work machine from the maximum number of battery blocks permissible to the electric work machine, the first command is transmitted from the battery blocks to the electric work machine. In response to supply of an electric power from the smaller number of battery blocks than the maximum number to the electric work machine, a second command is transmitted from the battery blocks to the electric work machine. This allows the user using the electric work machine to easily recognize whether the electric work machine is operating with a maximum electric power via a work machine notifier of the electric work machine which the user is easy to be aware of.

The battery pack may also include a notifier. The controller may further execute a prohibition notification process. The prohibition notification process includes: executing a discharge prohibition notification via the notifier in response to prohibiting discharge from all of the two or more battery blocks.

The discharge prohibition notification is executed in response to prohibiting discharge from all of the two or more battery blocks. This allows the user to be aware that the battery pack is not available.

The two or more battery blocks may include a first battery block and a second battery block. The electric work machine may include a first electric work machine or a second electric work machine. The first electric work machine has the electrical properties that a maximum number of battery blocks permissible is one. The second electric work machine has the electrical properties that the maximum number of battery blocks permissible is two. The connection circuit may include a first battery positive terminal, and/or a first battery negative terminal, and/or a second battery positive terminal, and/or a second battery negative terminal. The first battery positive terminal is connected to a positive electrode of the first battery block. The first battery negative terminal is connected to a negative electrode of the first battery block. The second battery positive terminal is connected to a positive electrode of the second battery block. The second battery negative terminal is connected to a negative electrode of the second battery block. The first battery positive terminal and the first battery negative terminal may be respectively connected to the positive terminal and the negative terminal of the first electric work machine in response to the battery pack being attached to the first electric work machine. The second battery positive terminal or the second battery negative terminal may be respectively disconnected from the positive terminal or the negative terminal of the first electric work machine in response to the battery pack being attached to the first electric work machine. The first battery positive terminal and the second battery positive terminal may be connected to a positive terminal of the second electric work machine in response to the battery pack being attached to the second electric work machine. The first battery negative terminal and the second battery negative terminal may be connected to a negative terminal of the second electric work machine in response to the battery pack being attached to the second electric work machine.

The connection circuit includes the first battery positive terminal, the first battery negative terminal, the second battery positive terminal, and the second battery negative terminal. This allows the first battery block, separately from the second battery block, to be connected to the positive terminal and the negative terminal of the electric work machine.

The battery pack may include a connector provided with the connection circuit. The connector may have a first end and a second end. The positive terminal and the negative terminal may be inserted to the connector from the first end toward the second end. The first battery positive terminal and the second battery positive terminal may be arranged in order from the first end to the second end. The first battery negative terminal and the second battery negative terminal may be arranged in order from the first end to the second end.

When the battery pack is attached to the electric work machine, the battery positive terminal and the battery negative terminal arranged closer to insertion openings for the positive terminal and the negative terminal in the connector are used first. Thus, the connector can have a simple configuration.

The two or more battery blocks may each have a positive electrode and a negative electrode. The two or more battery blocks may include a first battery block, a second battery block, and a third battery block. The electric work machine may include a first electric work machine. The first electric work machine has electrical properties that a maximum number of battery blocks permissible is one. The connection circuit may further include one balance circuit. The balance circuit is connected between the first battery block and the third battery block, and balances a capacity of the first battery block and a capacity of the third battery block. The positive electrode and the negative electrode of the first battery block may be respectively connected to the positive terminal and the negative terminal via the connection circuit in response to the battery pack being attached to the first electric work machine. The positive electrode of the second battery block may be connected to the positive electrode of the third battery block via the connection circuit in response to the battery pack being attached to the first electric work machine. The negative electrode of the second battery block may be connected to the negative electrode of the third battery block via the connection circuit.

When an electric power is supplied to the electric work machine from the first battery block, the second battery block is connected in parallel with the third battery block. Thus, a capacity of the second battery block can be balanced with the capacity of the third battery block. Further, the capacity of the first battery block can be balanced with the capacity of the second battery block by the balance circuit. Therefore, the capacities of the first, second, and third battery blocks can be balanced with each other. When an electric power is supplied to the electric work machine from two battery blocks, the capacities of the first, second, and third battery blocks can be balanced with each other by using the first battery block and the third battery block, or the second battery block and the third battery block. Accordingly, the capacities of the first, second, and third battery blocks can be balanced with each other by a minimum number of balance circuits.

A method in another aspect of the present disclosure includes:
  connecting a positive terminal of an electric work machine to a positive electrode of each of a specific number of battery blocks included in two or more battery blocks; and/or
  connecting a negative terminal of the electric work machine to a negative electrode of each of the specific number of battery blocks, and
  varying the specific number in accordance with electrical properties of the electric work machine.

According to the method described above, the same effect as the aforementioned battery pack can be exhibited.

The present disclosure may include the following item.

[Item A-1]

The aforementioned battery pack wherein the positive terminal and the negative terminal are configured in accordance with the maximum number of battery blocks permissible depending on the electrical properties, and
  the connection circuit is configured to receive the positive terminal and the negative terminal.

With the configuration as above, the positive terminal and the negative terminal configured in accordance with the number of battery blocks permissible to the electric work machine are connected to the connection circuit of the battery pack. This allows connecting the number of battery blocks permissible to the electric work machine to the positive terminal and the negative terminal via the connection circuit.

EXPLANATION OF REFERENCE NUMERALS

2 . . . trigger, 3 . . . tip tool, 5 . . . electric work machine, 8 . . . device display, 9 . . . battery attachment, 10 . . . battery pack, 11 . . . battery indicator, 15 . . . connector, 20, 21, 22 . . . battery block, 30 . . . microcomputer, T31, T32, T33, T34 . . . first, second, third, and fourth parallel connection terminal, 50 . . . balance circuit, 55A, 55B, 55C, 55D, 155C . . . attachment surface, 111, 121, 131, 141 . . . positive terminal, 112, 122, 132, 142 . . . negative terminal, 113, 123, 133, 143 . . . first work machine communication terminal, 114, 124, 134, 144 . . . second work machine communication terminal, 121a, 141a . . . positive electrode conduction portion, 121b, 141b . . . positive electrode insulated portion, 122a, 142a . . . negative electrode conduction portion, 122b, 142b . . . negative electrode insulated portion, 131a, 131c . . . first, second positive electrode conduction portion, 131b, 131d . . . first, second positive electrode insulated portion, 132a, 132c . . . first, second negative electrode conduction portion, 132b, 132d . . . first, second negative electrode insulated portion, 132d . . . second negative electrode insulated portion, 200, 210, 220 . . . first, second, third battery circuit, 211 . . . charger positive terminal, 212 . . . charger negative terminal, 213 . . . charger communication terminal, 590, 591, 592 . . . protection FET, TAS . . . first communication terminal, TC0, TC1, TC2 . . . first, second, third charging terminal, TN0, TN1, TN2 . . . first, second, third battery negative terminal, TP0, TP1, TP2 . . . first, second, third battery positive terminal.

MODE FOR CARRYING OUT THE INVENTION

Example embodiments to carry out the present disclosure will be described hereinafter with reference to the accompanying drawings.

First Embodiment

<1. System Configuration>

Figure 1:
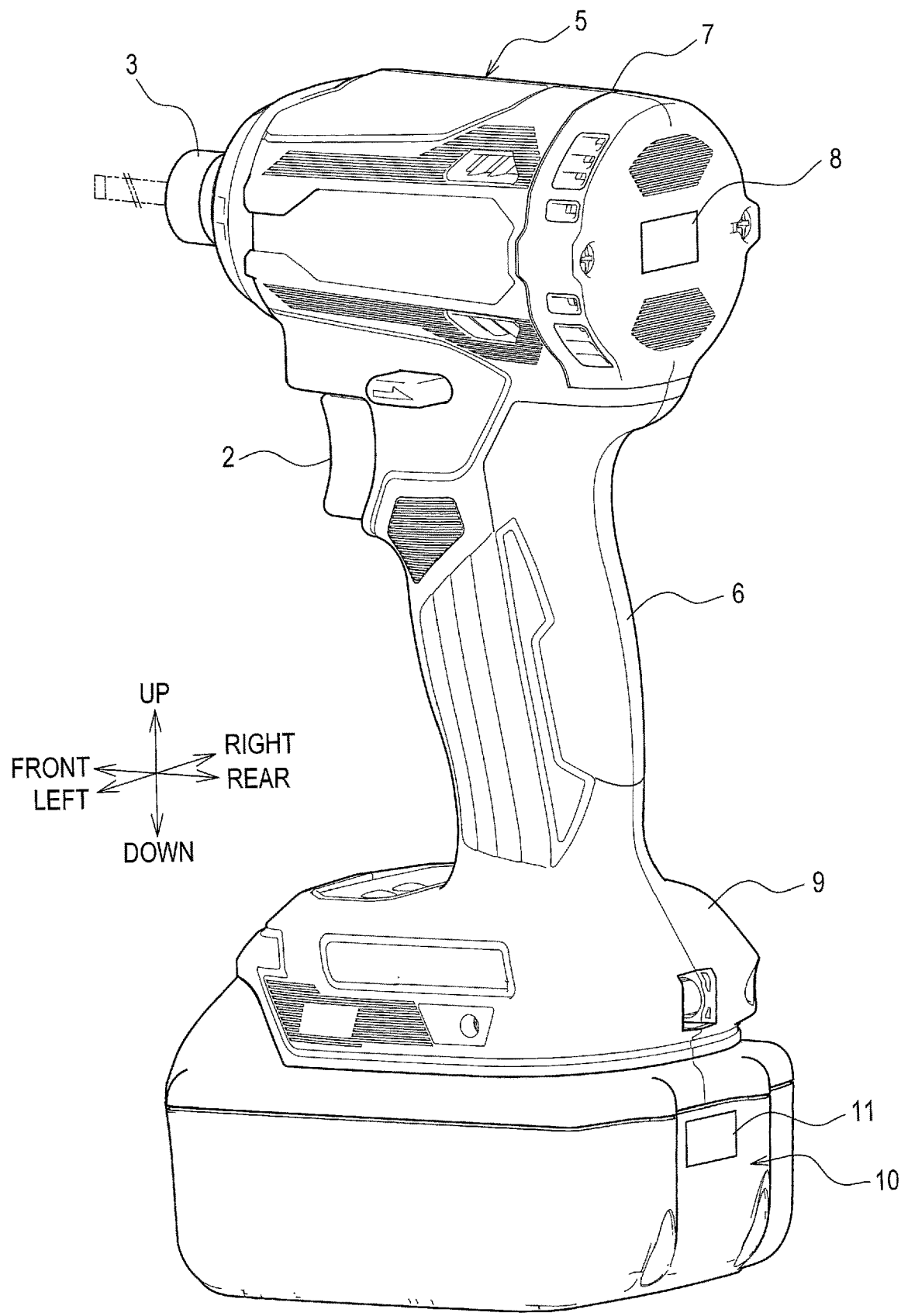
FIG. 1 is a view showing an external appearance of an electric work machine and a battery pack according to a first embodiment.

An overview of a battery system according to the present embodiment will be described with reference to FIG. 1. The battery system according to the present embodiment includes an electric work machine 5 and a battery pack 10. The electric work machine 5 is a gardening apparatus, an electric power tool or the like that is operated by an electric power from the battery pack 10. The gardening apparatus includes, for example, a grass cutter, a hedge trimmer, and the like. The electric power tool includes an impact driver, a chainsaw, a blower, and the like. The present embodiment will be described by taking an impact driver as an example of the electric work machine 5.

The electric work machine 5 includes a grip 6 having a columnar shape, a head 7 having a cylindrical shape, and a battery attachment 9 having a cuboid shape. The head 7 is arranged on top of the grip 6, and the battery attachment 9 is arranged at the bottom of the grip 6. In the present embodiment, an extending direction of the grip 6 is referred to as up-down direction, an extending direction of the head 7 is referred to as front-rear direction, and a direction perpendicular to the up-down direction and the front-rear direction is referred to as left-right direction.

The head 7 includes therein a not shown motor, and a controller for controlling the motor. A tip tool 3 is attachable to a leading end on the front side of the head 7. The motor is driven by an electric power from the battery pack 10. The tip tool 3 rotates when receiving a rotational force generated by the drive of the motor. A device display 8 is arranged on a rear surface of the head 7. Specifically, the device display 8 is arranged at a position in which a user can easily view the device display 8 when the user grasps the grip 6 and turns the tip tool 3 toward a workpiece. The device display 8 includes, for example, two or more LEDs, and each LED turns on, blinks, or turns off in accordance with battery information received from the battery pack 10 and information on the electric work machine 5. The device display 8 corresponds to one example of a work machine notifier of the present disclosure.

A trigger 2 is arranged on a front surface of the grip 6. The trigger 2 is a manipulator operated by a user. When the user pulls the trigger 2, an electric power is supplied from the battery pack 10 to the motor and the tip tool 3 rotates.

The battery pack 10 has a resin case having a cuboid shape, and is attached to the bottom of the battery attachment 9. The battery pack 10 includes a battery indicator 11. The battery indicator 11 is, for example, arranged on a rear surface of the battery pack 10. The battery indicator 11 includes, for example, two or more LEDs, and each LED turns on, blinks, or turns off in accordance with a state of the battery pack 10. The battery indicator 11 corresponds to one example of a battery notifier of the present disclosure.

<2. Configuration of Battery Pack>
<2-1. Circuit Configuration of Battery Pack>

A configuration of the battery pack 10 will be described with reference to FIGS. 2 and 3. The battery pack 10 includes a connector 15 on an upper surface of the resin case. The battery pack 10 also includes, inside the resin case, first, second and third battery blocks 20, 21, 22, a first battery circuit 200, a second battery circuit 210, and a third battery circuit 220.

The first, second and third battery blocks 20, 21, 22 have the same rated voltage and the same impedance, and each battery block is configured by directly connecting two or more battery cells. The first, second and third battery blocks 20, 21, 22 are, for example, lithium iron rechargeable batteries, and each has, for example, a rated voltage of 18 V and, for example, an impedance of 100 mΩ. When two of the first, second and third battery blocks 20, 21, 22 are connected in parallel to each other, an impedance of the battery pack 10 is about 50 mΩ When three of the first, second and third battery blocks 20, 21, 23 are connected in parallel to each other, the impedance of the battery pack 10 is about 33 mΩ.

Figure 2:
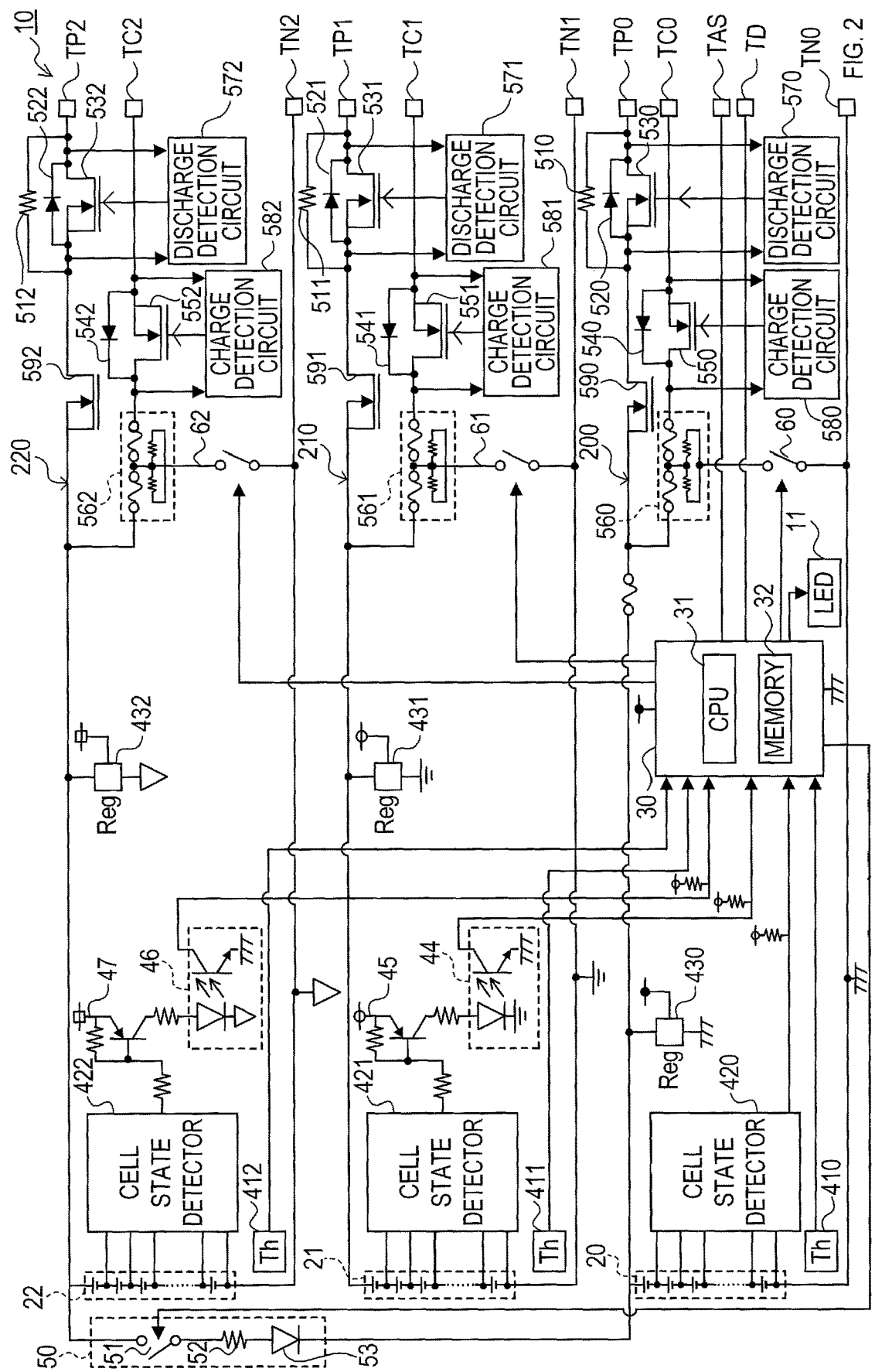
FIG. 2 is a block diagram showing a circuit configuration of the battery pack according to the first embodiment.
Figure 3:
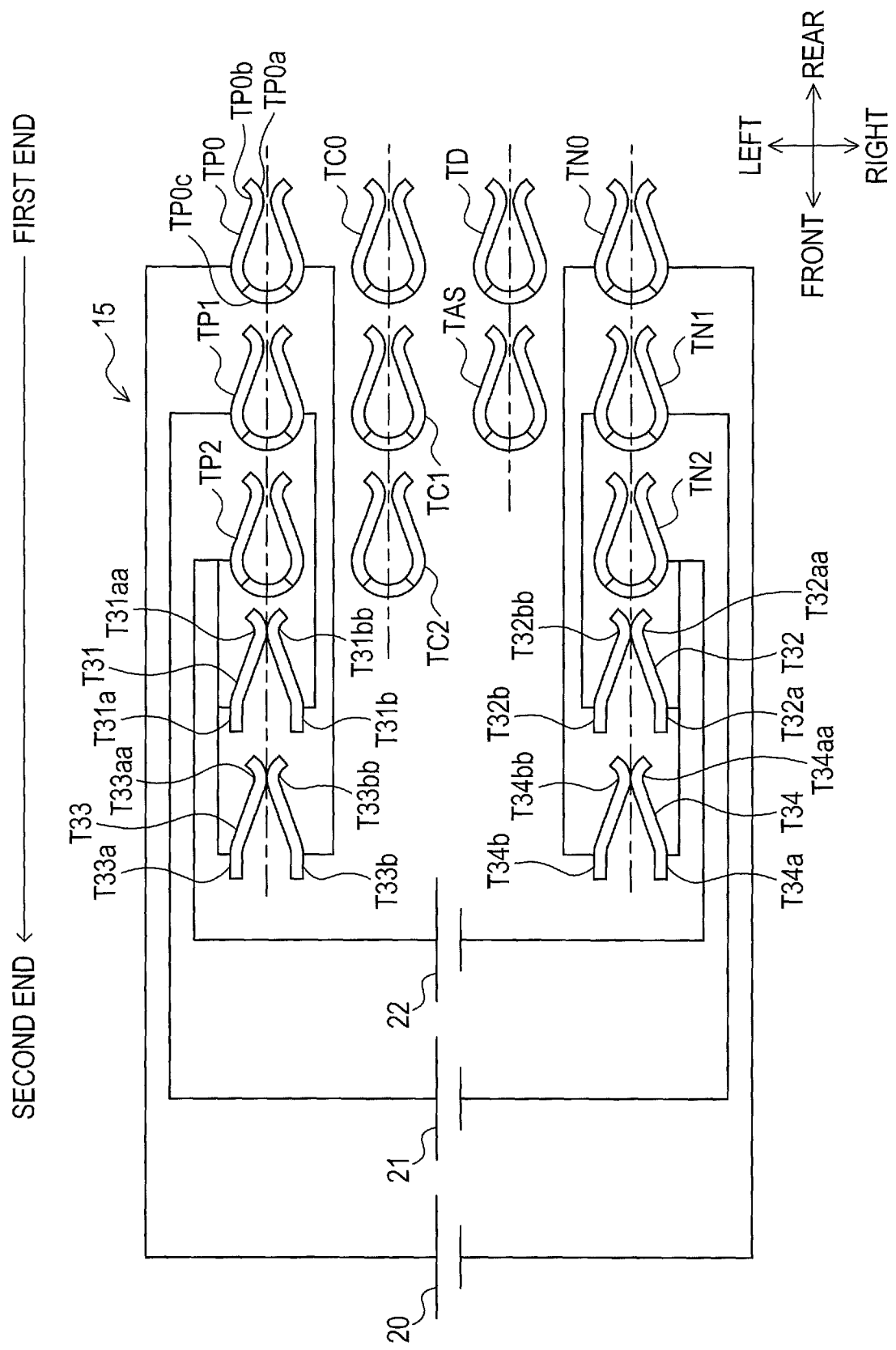
FIG. 3 is a schematic view showing a shape of each terminal of a connector of the battery pack and a connecting state between a battery block and each terminal according to the first embodiment.

As shown in FIG. 2, a first battery positive terminal TP0 is connected to a positive electrode of the first battery block 20 via a first positive electrode line of the first battery circuit 200. A first battery negative terminal TN0 is connected to a negative electrode of the first battery block 20 via a first negative electrode line of the first battery circuit 200. A first charging terminal TC0 is connected to a first charging line that is connected to the first positive electrode line. An electric potential of the first negative electrode line is a ground level of the first battery circuit 200.

A second battery positive terminal TP1 is connected to a positive electrode of the second battery block 21 via a second positive electrode line of the second battery circuit 210. A second battery negative terminal TN1 is connected to a negative electrode of the second battery block 21 via a second negative electrode line of the second battery circuit 210. A second charging terminal TC1 is connected to a second charging line that is connected to the second positive electrode line. An electric potential of the second negative electrode line is a ground level of the second battery circuit 210.

A third battery positive terminal TP2 is connected to a positive electrode of the third battery block 22 via a third positive electrode line of the third battery circuit 220. A third battery negative terminal TN2 is connected to a negative electrode of the third battery block 22 via a third negative electrode line of the third battery circuit 220. A third charging terminal TC2 is connected to a third charging line that is connected to the third positive electrode line. An electric potential of the third negative electrode line is a ground level of the third battery circuit 220.

The first battery circuit 200, the second battery circuit 210, and the third battery circuit 220 have the same basic configuration. First, the configuration common to the first battery circuit 200, the second battery circuit 210, and the third battery circuit 220 will be described. In the present embodiment, the first battery circuit 200, the second battery circuit 210, and the third battery circuit 220 correspond to one example of a connection circuit.

The first, second and third battery circuits 200, 210, 220 respectively include cell state detectors 420, 421, 422, temperature detectors 410, 411, 412, regulators 430, 431, 432, Self Control Protector (SCP) circuits 560, 561, 562, discharge reverse flow prevention field effect transistors (FET) 530, 531, 532, semiconducting resistors 510, 511, 512, charging reverse flow prevention FETs 550, 551, 552, discharge detection circuits 570, 571, 572, charge detection circuits 580, 581, 582, switches 60, 61, 62, and protection FETs 590, 591, 592.

The regulators 430, 431, 432 are respectively connected to the first, second and third positive electrode lines. The regulators 430, 431, 432 respectively receive power supplies from the first, second and third battery blocks 20, 21, 22, and generate power-supply voltages used in the first, second and third battery circuits 200, 210, 220. The power-supply voltage generated by the regulator 430 is a voltage based on the ground level of the first battery circuit 200, and the power-supply voltage generated by the regulator 431 is a voltage based on the ground level of the second battery circuit 210. The power-supply voltage generated by the regulator 432 is a voltage based on the ground level of the third battery circuit 220.

The cell state detectors 420, 421, 422 are respectively connected to the first, second and third battery blocks 20, 21, 22, and detect cell voltages of respective battery cells included in the first, second and third battery blocks 20, 21, 22. The cell state detectors 420, 421, 422 also detect charging currents that flow into the first, second and third battery blocks 20, 21, 22, and discharging currents that flow out of the first, second and third battery blocks 20, 21, 22. The cell state detectors 420, 421, 422 convert respective detection values detected to digital signals, and output the converted digital signals to a later-described microcomputer 30.

The temperature detectors 410, 411, 412 each include a thermistor, and detect a cell temperature of at least one battery cell included in the first, second and third battery blocks 20, 21, 22. The temperature detectors 410, 411, 412 each output the detected cell temperature as an analog signal to the later-described microcomputer 30.

The SCP circuits 560, 561, 562 are respectively arranged on the first, the second, and third charging lines, and serve to avoid overcharged states of the first, second and third battery blocks 20, 21, 22. The switches 60, 61, 62 are respectively connected between the SCP circuits 560, 561, 562 and the first, second and third negative electrode lines.

The SCP circuits 560, 561, 562 each include a self-melting fuse and a heat generation resistive element. The microcomputer 30 sends commands to the switches 60, 61, 62 to be ON when the first, second and third battery blocks 20, 21, 22 are continuously unavailable. When the switches 60, 61, 62 are turned on by the commands from the microcomputer 30, the heat generation resistive elements of the SCP circuits 560, 561, 562 generate heat by currents flowing therethrough, and the self-melting fuses are melted. This interrupts the first, second and third charging lines, and disable charging of the first, second and third battery blocks 20, 21, 22.

The discharge reverse flow prevention FETs 530, 531, 532 are respectively arranged on the first, second and third positive electrode lines. The discharge reverse flow prevention FETs 530, 531, 532 respectively include parasitic diodes 520, 521, 522. Anode terminals of the parasitic diodes 520, 521, 522 are respectively connected to drain terminals of the protection FETs 590, 591, 592, and cathode terminals thereof are respectively connected to the first, second and third battery positive terminals TP0, TP1, TP2. The discharge detection circuits 570, 571, 572 respectively prevent or inhibit electric currents from flowing from the first, second and third battery positive terminals TP0, TP1, TP2 to the positive electrodes of the first, second and third battery blocks 20, 21, 22 using the parasitic diodes 520, 521, 522.

Specifically, the discharge detection circuits 570, 571, 572 are connected to drain terminals and source terminals of the respective discharge reverse flow prevention FETs 530, 531, 532, and measure potential differences between the drain terminals and source terminals of the respective discharge reverse flow prevention FETs 530, 531, 532. The discharge detection circuits 570, 571, 572, until detecting discharging currents flowing in a forward direction of the parasitic diodes 520, 521, 522 using the potential differences, maintain the discharge reverse flow prevention FETs 530, 531, 532 off. The discharge detection circuits 570, 571, 572, when detecting the discharging currents flowing in the forward direction of the parasitic diodes 520, 521, 522, turn on the discharge reverse flow prevention FETs 530, 531, 532.

The semiconducting resistors 510, 511, 512 are respectively connected in parallel to the discharge reverse flow prevention FETs 530, 531, 532 between the drain terminals and the source terminals of the discharge reverse flow prevention FETs 530, 531, 532. The semiconducting resistors 510, 511, 512 each bring a semiconducting state between the positive electrodes of the first, second and third battery blocks 20, 21, 22 and the first, second and third battery positive terminals TP0, TP1, TP2. The semiconducting state corresponds to an intermediate state between an interrupted state and a conducting state. In the interrupted state, electric currents are interrupted between the positive electrodes of the first, second and third battery blocks 20, 21, 22 and the first, second and third battery positive terminals TP0, TP1, TP2. In the conducting state, electric currents flow between the positive electrodes of the first, second and third battery blocks 20, 21, 22 and the first, second and third battery positive terminals TP0, TP1, TP2. In the semiconducting state, electric currents smaller than those in the conducting state flow between the positive electrodes of the first, second and third battery blocks 20, 21, 22 and the first, second and third battery positive terminals TP0, TP1, TP2.

Specifically, resistance values of the semiconducting resistors 510, 511, 512 are adjusted so as to flow electric currents smaller than those when the discharge reverse flow prevention FETs 530, 531, 532 are ON. This inhibits overcurrents from flowing from high voltage battery blocks to low voltage battery blocks even if the first, second and third battery blocks 20, 21, 22 are connected in parallel to each other when the voltages of the first, second and third battery blocks 20, 21, 22 differ from each other depending on the use.

The protection FETs 590, 591, 592 are respectively arranged on the first, second and third positive electrode lines. Specifically, drain terminals of the protection FETs 590, 591, 592 are respectively connected to source terminals of the discharge reverse flow prevention FETs 530, 531, 532, and the source terminals of the protection FETs 590, 591, 592 are respectively connected to the positive electrodes of the first, second and third battery blocks 20, 21, 22. The protection FETs 590, 591, 592 are controlled to be ON and OFF by the later-described microcomputer 30. The microcomputer 30, when the battery pack 10 is attached to the battery attachment 9 of the electric work machine 5, turns on a specific number of the protection FETs 590, 591, 592, and turns off the remaining protection FETs. The specific number corresponds to the number of battery blocks permissible to the electric work machine 5.

The charging reverse flow prevention FETs 550, 551, 552 are respectively arranged on the first, second and third charging lines. The charging reverse flow prevention FETs 550, 551, 552 respectively include parasitic diodes 540, 541, 542. Anode terminals of the parasitic diodes 540, 541, 542 are respectively connected to the first, second and third charging terminals TC0, TC1, TC2, and cathode terminals thereof are respectively connected to the SCP circuits 560, 561, 562. The charge detection circuits 580, 581, 582 prevent or inhibit electric currents from flowing from the positive electrodes of the first, second and third battery blocks 20, 21, 22 to the first, second and third charging terminals TC0, TC1, TC2 using the parasitic diodes 540, 541, 542.

Specifically, the charge detection circuits 580, 581, 582 are respectively connected to drain terminals and source terminals of the charging reverse flow prevention FETs 550, 551, 552, and measure respective potential differences between the drain terminals and the source terminals of the charging reverse flow prevention FETs 550, 551, 552. The charge detection circuits 580, 581, 582, until detecting the charging currents flowing in a forward direction of the parasitic diodes 540, 541, 542 using the potential differences, maintain the charging reverse flow prevention FETs 550, 551, 552 off. The charge detection circuits 580, 581, 582, when detecting the charging currents flowing in the forward direction of the parasitic diodes 540, 541, 542, turn on the charging reverse flow prevention FETs 550, 551, 552.

Next, a description will be given on different configurations of the second and third battery circuits 210, 220 and the first battery circuit 200. The second battery circuit 210 and the third battery circuit 220 have the same configuration.

The second and third battery circuits 210, 220 respectively include photocouplers 44, 46 and power sources 45, 47. On the other hand, the first battery circuit 200 includes the microcomputer 30.

The battery pack 10 is connected to a target device so that the first negative electrode line of the first battery circuit 200 has a reference potential (that is, a reference ground level). Thus, the microcomputer 30 is provided in the first battery circuit 200 having the reference potential, and is not provided in the second and third battery circuits 210, 220.

The microcomputer 30 includes a CPU 31 and a memory 32 such as a ROM and a RAM. The microcomputer 30 executes various processes by the CPU 31 executing programs stored in the memory 32.

The microcomputer 30 is connected to a first communication terminal TAS via a signal line, and is connected to a second communication terminal TD via a signal line. The first communication terminal TAS is connected to a first work machine communication terminal of the electric work machine 5 when the battery pack 10 is attached to the electric work machine 5. The second communication terminal TD is connected to a second work machine communication terminal of the electric work machine 5 when the battery pack 10 is attached to the electric work machine 5. Further, the second communication terminal TD is connected to a charger communication terminal of the charger when the battery pack 10 is connected to the charger. The first communication terminal TAS is a terminal dedicated to outputting a discharge prohibition signal or a discharge permission signal, and the second communication terminal TD is a terminal for a serial communication such as UART.

The microcomputer 30 is connected to the temperature detectors 410, 411, 412 and the cell state detector 420 via signal lines. Further, the microcomputer 30 is connected to photocouplers 46, 44 via signal lines. Input sides of the photocouplers 46, 44 are respectively connected to the cell state detectors 422, 421, and output sides of the photocouplers 46, 44 are connected to the microcomputer 30. The input sides of the photocouplers 46, 44 are respectively operated by power supplies from the power sources 47, 45, and the output sides of the photocouplers 46, 44 are operated by a power supply from the first battery circuit 200. Accordingly, the second and third battery blocks 21, 22 are isolated from the microcomputer 30. Therefore, the microcomputer 30 is not influenced by electric potentials of the second and third battery blocks 21, 22.

The signal line connecting the microcomputer 30 to the cell state detector 420 and the signal lines connecting the microcomputer 30 to the respective photocouplers 46, 44 are pulled up to different levels. Accordingly, the microcomputer 30 can distinguish signals inputted from the cell state detectors 420, 421, 422.

The microcomputer 30 determines whether the first, second and third battery blocks 20, 21, 22 are in a dischargeable state based on battery information of the first, second and third battery blocks 20, 21, 22 acquired from the temperature detectors 410, 411, 412 and the cell state detectors 420, 421, 422. The microcomputer 30, when the battery pack 10 is attached to the electric work machine 5, transmits the discharge prohibition signal or the discharge permission signal to the electric work machine 5 via the first communication terminal TAS in accordance with the determined states of the first, second and third battery blocks 20, 21, 22. Also, the microcomputer 30 acquires later-described electric work machine information of the electric work machine 5 via the second communication terminal TD. Further, the microcomputer 30 transmits a notification command to the electric work machine 5 via the second communication terminal TD, in order to provide information in response to the states of the first, second and third battery blocks 20, 21, 22. The electric work machine 5, in accordance with the received notification command, controls a display of the device display 8. The first battery circuit 200 do not have to have the second communication terminal TD, and may use the first communication terminal TAS as a terminal for outputting the discharge prohibition signal or the discharge permission signal and a terminal for a serial communication.

Also, the microcomputer 30, when the battery pack 10 is attached to the charger, collects the battery information of the first, second and third battery blocks 20, 21, 22, and transmits the collected battery information to the charger via the second communication terminal TD. Further, the microcomputer 30 receives a charging information from the charger via the second communication terminal TD.

The battery pack 10 further includes a balance circuit 50. The balance circuit 50 is arranged between the positive electrode of the first battery block 20 and the positive electrode of the third battery block 22. The balance circuit 50 includes a switch 51, a resistor 52, and a diode 53 that are connected in series. An anode terminal of the diode 53 is connected to a positive electrode side of the second battery block 22, and a cathode terminal of the diode 53 is connected to a positive electrode side of the first battery block 20. The microcomputer 30 controls ON and OFF of the switch 51. In the present embodiment, the first battery block 20 corresponds to one example of a first battery block of the present disclosure, the second battery block 21 corresponds to one example of a second battery block of the present disclosure, and the third battery block 22 corresponds to one example of a third battery block of the present disclosure.

In the present embodiment, the specific number of battery blocks of the first, second and third battery blocks 20, 21, 22 are connected to the electric work machine 5. The specific number is a number corresponding to an internal impedance permissible to the electric work machine 5. For example, if the electric work machine 5 permits a low impedance, the first, second and third battery blocks 20, 21, 22 are connected to the electric work machine 5 in parallel to each other. On the other hand, if the electric work machine 5 permits only a high impedance, one of the first, second and third battery blocks 20, 21, 22 is connected to the electric work machine 5. If the electric work machine 5 permits a medium impedance, two of the first, second and third battery blocks 20, 21, 22 are connected to the electric work machine 5 in parallel to each other.

In the present embodiment, the first, second and third battery blocks 20, 21, 22 are preferentially used in the order of the first battery block 20 and then the second battery block 21. Therefore, a voltage of the first battery block 20 tends to be lower than a voltage of the third battery block 22. Thus, the microcomputer 30, when a voltage difference or a remaining energy difference between the first battery block 20 and the third battery block 22 exceeds a threshold, turns on the switch 51. This causes an electric current to flow from the third battery block 22 to the first battery block 20, and remaining energies of the third battery block 20 and the first battery block 22 are equalized. Further, the parallel connection of the third battery block 22 and the second battery block 21 equalizes remaining energies of the third battery block 22 and the second battery block 21. Accordingly, the remaining energies of the first, second and third battery blocks 20, 21, 22 can be equalized.

In the present embodiment, the first battery block 20 connected to the first battery circuit 200 that includes the microcomputer 30 is preferentially used. However, the priority order of the first, second and third battery blocks 20, 21, 22 is not limited to this. For example, the first, second and third battery blocks 20, 21, 22 may be preferentially used in the order of the third battery block 22 and then the second battery block 21. In this case, the anode terminal of the diode 53 included in the balance circuit 50 is connected to the positive electrode side of the first battery block 20, and the cathode terminal of the diode 53 is connected to a positive electrode side of the third battery block 22. This causes an electric current to flow from the first battery block 20 to the third battery block 22, and the remaining energies of the first battery block 20 and the third battery block 22 are equalized. Further, the parallel connection of the first battery block 20 and the second battery block 21 equalizes the remaining energies of the first battery block 20 and the second battery block 21.

<2-2. Configuration of Connector of Battery Pack>

Next, a description will be given on detailed configuration of the connector 15 of the battery pack 10 with reference to FIG. 3. FIG. 3 is a schematic plan view of the connector 15 as seen from above. The connector 15 includes four insertion grooves to which plate-shaped terminals of the target device are inserted. In the first insertion groove, the first battery positive terminal TP0, the second battery positive terminal TP1, the third battery positive terminal TP2, the first parallel connection terminal T31, and the third parallel connection terminal T33 are arranged in this order from the rear to the front.

In the second insertion groove, the first charging terminal TC0, the second charging terminal TC1, and the third charging terminal TC2 are arranged in this order from the rear to the front. In the third insertion groove, the second communication terminal TD and the first communication terminal TAS are arranged in this order from the rear to the front. In the fourth insertion groove, the first battery negative terminal TN0, the second battery negative terminal TN1, the third battery negative terminal TN2, the second parallel connection terminal T32, and the fourth parallel connection terminal T34 are arranged in this order from the rear to the front.

The first battery positive terminal TP0 is formed by a metal plate bent into a U-shape, and has a dent TP0$b$ dented inward on both side surfaces near an insertion opening TP0$a$. The first battery positive terminal TP0 is arranged so that the insertion opening TP0$a$ is located on a rear side, and the dent TP0$b$ is configured to contact both surfaces of the plate-shaped terminal. Also, the first battery positive terminal TP0 has an opening TP0$c$ formed on a front side opposite to the insertion opening TP0$a$ in order to hold the plate-shaped terminal, which is in contact with the first battery positive terminal TP0, with the plate-shaped terminal penetrating the first battery positive terminal TP0 from the rear to the front.

The second and third battery positive terminals TP1, TP2, the first, second and third charging terminals TC0, TC1, TC2, the first communication terminal TAS, the second communication terminal TD, and the first, second and third battery negative terminals TN0, TN1, TN2 are formed in the same shape as the first battery positive terminal TP0.

The first parallel connection terminal T31 includes a first member T31$a$ and a second member T31$b$. The first member T31$a$ and the second member T31$b$ are plate-shaped metal members, and arranged to extend in a front-rear direction. The first member T31$a$ and the second member T31$b$ are arranged side by side on left and right. The first member T31$a$ has a dent T31$as$ near a rear end thereof dented toward the second member T31$b$. The second member T31$b$ has a dent T31$bb$ near a rear end thereof dented toward the first member T31$a$.

The first member T31$a$ and the second member T31$b$ are electrically connected by bringing the dent T31$as$ and the dent T31$bb$ into contact with each other, and are electrically disconnected by keeping the dent T31$aa$ and the dent T31$bb$ away from each other. Specifically, the first member T31$a$ and the second member T32$b$ are configured to be connectable or disconnectable. The first member T31$a$ and the second member T31$b$, when nothing is inserted to the first parallel connection terminal T31, are electrically connected. The first member T31$a$ and the second member T31$b$, when a later-described insulated portion of the plate-shaped terminal is inserted to the first parallel connection terminal T31, are electrically disconnected.

The second, third, and fourth parallel connection terminals T32, T33, T34 are configured in the same manner as the first parallel connection terminal T31. Specifically, the second, third, and fourth parallel connection terminals T32, T33, T34, like the first parallel connection terminal T31, include the first members T32$a$, T33$a$, T34$a$ and the second members T32$b$, T33$b$, T34$b$, respectively. The first members T32$a$, T33$a$, T34$a$, like the first member T31$a$, have dents T32$aa$, T33$aa$, T34$aa$, respectively. The second members T32$b$, T33$b$, T34$b$, like the second member T31$b$, have dents T32$bb$, T33$bb$, T34$bb$, respectively.

The first members T32$a$, T33$a$, T34$a$ and the second members T32$b$, T33$b$, T33$c$, when nothing is inserted to the second, third, and fourth parallel connection terminals T32, T33, T34, are electrically connected. The first members T32$a$, T33$a$, T34$a$ and the second members T32$b$, T33$b$, T34$b$, when insulated portions of the plate-shaped terminals are inserted to the second, third, and fourth parallel connection terminals T32, T33, T34, are electrically disconnected.

The first members T31a, T33a of the first and third parallel connection terminals T31, T33 are respectively connected to the positive electrodes of the third battery positive terminal TP2 and the third battery block 22. The second member T31b of the first parallel connection terminal T31 is connected to the second battery positive terminal TP1, and the second member T33b of the third parallel connection terminal T33 is connected to the first battery positive terminal TP0.

The first members T32a, T34a of the second and fourth parallel connection terminal T32, T34 are respectively connected to the third battery negative terminal TN2 and the negative electrode of the third battery block 22. The second member T32b of the second parallel connection terminal T32 is connected to the second battery negative terminal TN1, and the second member T34b of the fourth parallel connection terminal T34 is connected to the first battery negative terminal TN0.

Therefore, when the target device is not connected to the connector 15, the first battery block 20, the second battery block 21, and the third battery block 22 are connected in parallel to each other. Specifically, when the battery pack 10 is detached from the target device and stored, the first battery block 20, the second battery block 21, and the third battery block 22 are connected in parallel to each other, and the remaining energies are equalized.

<3. Configuration of Connected Device>
<3-1. Configuration of Attachment Portion of First Electric Work Machine>

The first electric work machine 5 permits a low impedance. Specifically, the first electric work machine 5 permits the first, second and third battery blocks 20, 21, 22 connected in parallel. Thus, an attachment surface 55A of the battery attachment 9 of the first electric work machine 5 is configured to be connected to the first, second and third battery blocks 20, 21, 22.

Figure 4:
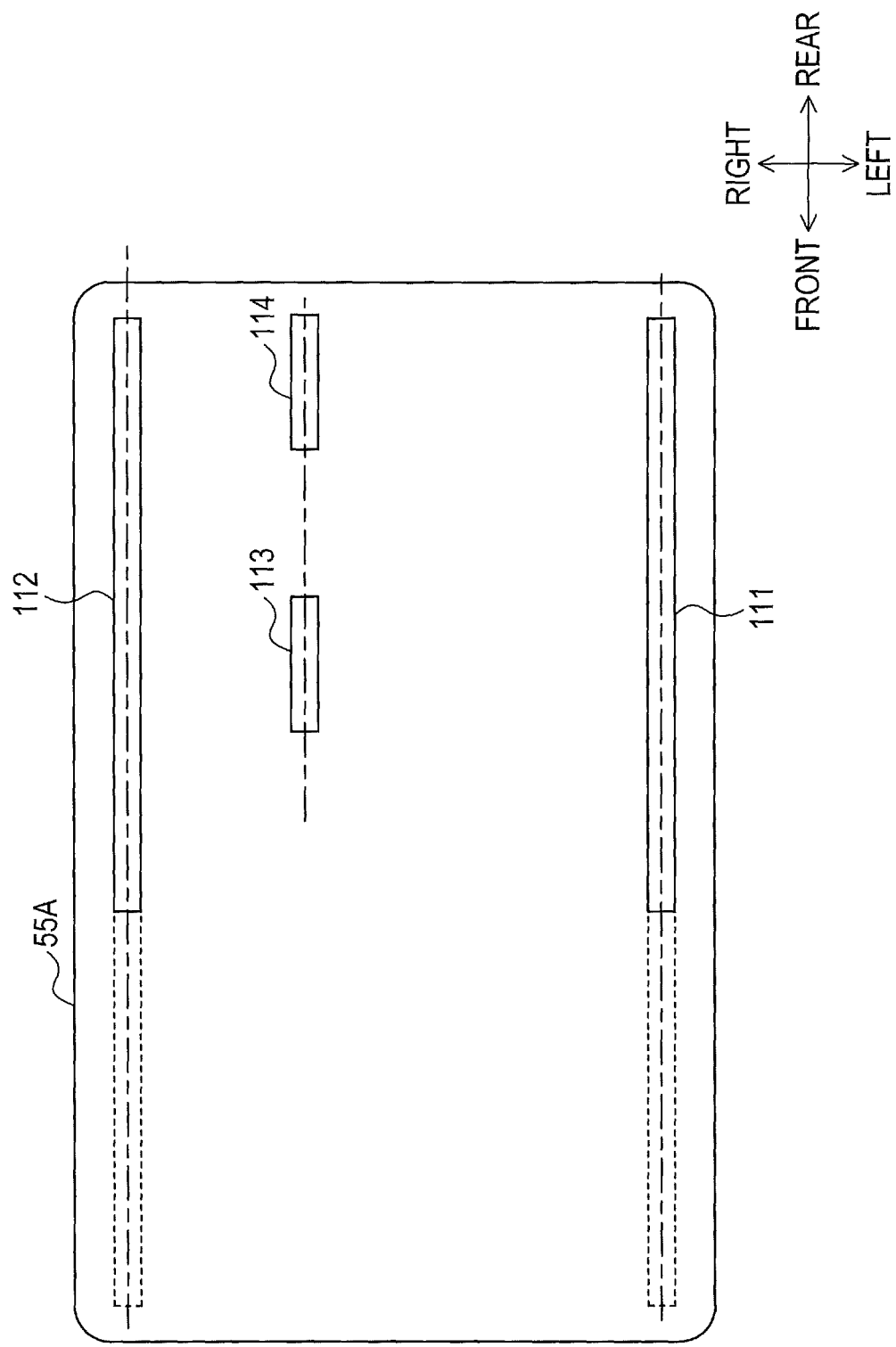
FIG. 4 is a schematic view showing a configuration of an attachment portion of a first electric work machine according to the first embodiment.

FIG. 4 is a plan view of the attachment surface 55A seen from the bottom. The attachment surface 55A is a surface that faces the connector 15 of the battery pack 10. The attachment surface 55A includes a positive terminal 111, a negative terminal 112, a first work machine communication terminal 113, and a second work machine communication terminal 114. Each terminal is a plate-shaped terminal made of metal, has a surface perpendicular to the left-right direction, and protrudes from the top to the bottom. The positive terminal 111 is configured to be connected to the positive electrodes of the first, second and third battery blocks 20, 21, 22, and the negative terminal 112 is configured to be connected to the negative electrodes of the first, second and third battery blocks 20, 21, 22. The attachment surface 55A corresponds to one example of a work machine connector of the present disclosure.

Figure 5:
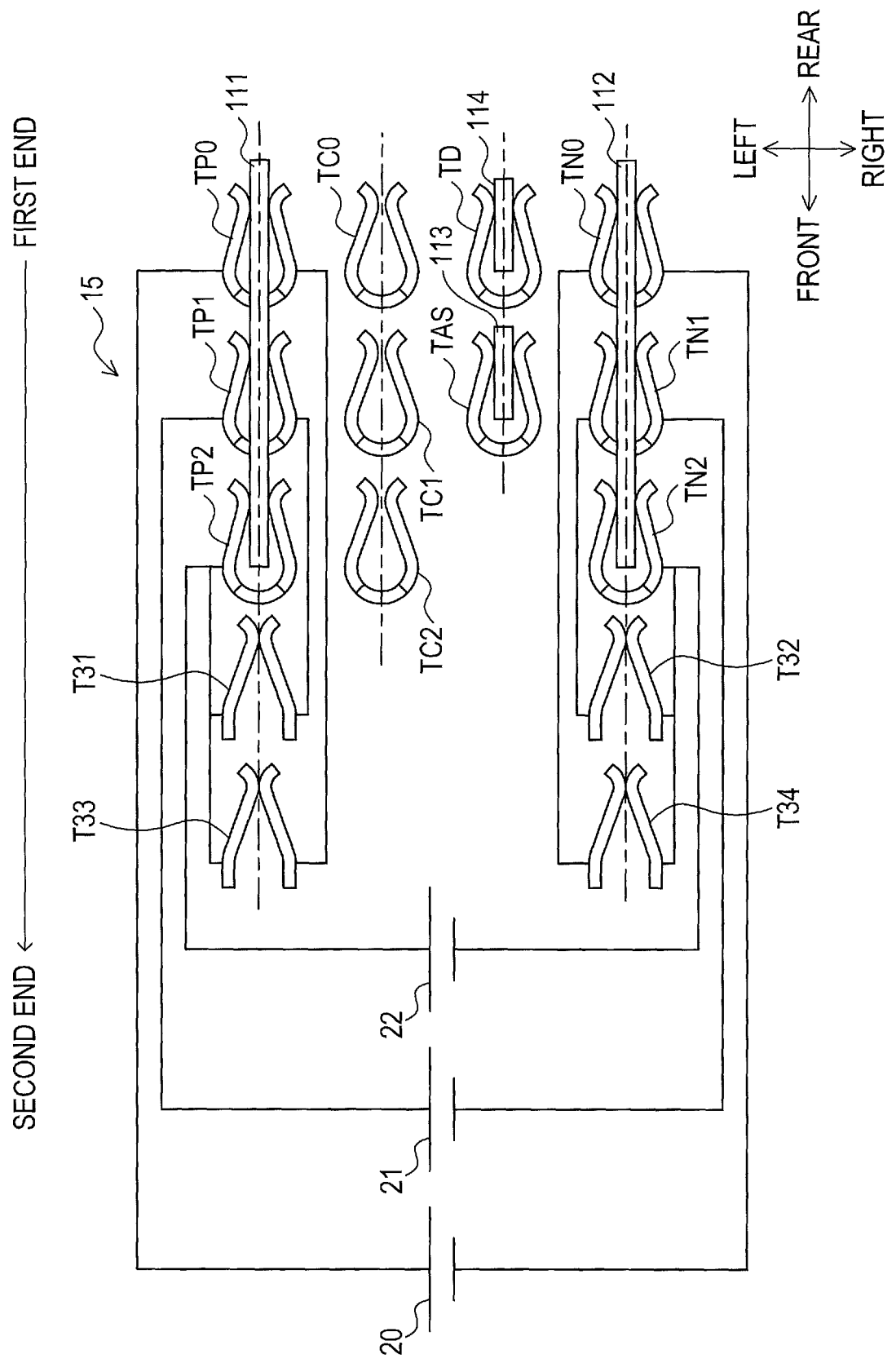
FIG. 5 is a schematic view showing a state in which the attachment portion of the first electric work machine is attached to the connector of the battery pack according to the first embodiment.

As shown in FIG. 5, the positive terminal 111 is arranged at a position corresponding to a terminal row including the first battery positive terminal TP0. The positive terminal 111 is configured to have a length to penetrate the first and second battery positive terminals TP0, TP1, and pass dents of the third battery positive terminal TP2 but not to penetrate the third battery positive terminal TP2 through.

The negative terminal 112 is arranged at a position corresponding to a terminal row including the first battery negative terminal TN0. The negative terminal 112 is configured to have a length to penetrate the first and second battery negative terminals TN0, TN1, and pass dents of the third battery negative terminal TN2 but not to penetrate the third battery negative terminal TN2.

The first work machine communication terminal 113 is arranged at a position corresponding to the first communication terminal TAS. The first work machine communication terminal 113 is configured to be longer than a distance from an insertion opening of the first communication terminal TAS to dents of the first communication terminal TAS. The second work machine communication terminal 114 is arranged at a position corresponding to the second communication terminal TD. The second work machine communication terminal 114 is configured to be longer than a distance from an insertion opening of the second communication terminal TD to dents of the second communication terminal TD.

As shown in FIG. 5, attachment of the battery pack 10 to the battery attachment 9 causes the positive terminal 111 to conduct with the first, second and third battery positive terminals TP0, TP1, TP2. Also, the negative terminal 112 conducts with the first, second and third battery negative terminals TN0, TN1, TN2. In addition, the first work machine communication terminal 113 conducts with the first communication terminal TAS, and the second work machine communication terminal 114 conducts with the second communication terminal TD.

Accordingly, when the battery attachment 9 is attached to the battery pack 10, the first battery block 20, the second battery block 21, and the third battery block 22 are connected in parallel to each other, and electric powers of the battery blocks 20, 21, 22 connected in parallel are outputted from the connector 15 of the battery pack 10 to the first electric work machine 5.

<3-2. Configuration of Attachment Portion of Second Electric Work Machine>

The second electric work machine 5 permits a medium impedance. Specifically, the second electric work machine 5 permits two battery blocks connected in parallel. Thus, an attachment surface 55B of the battery attachment 9 of the second electric work machine 5 is configured to be connected to two battery blocks.

Figure 6:
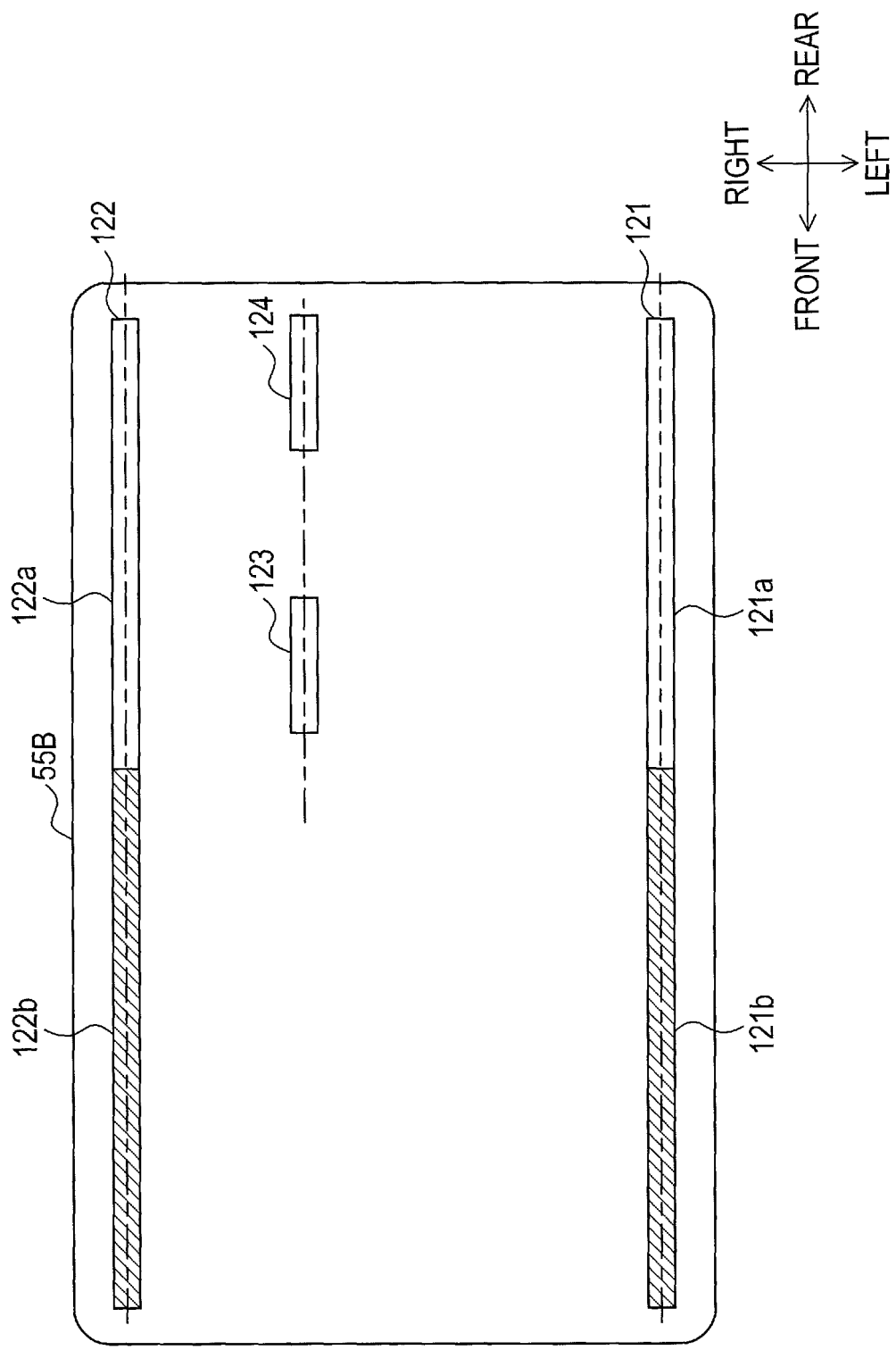
FIG. 6 is a schematic view showing a configuration of an attachment portion of a second electric work machine according to the first embodiment.

FIG. 6 is a plan view of the attachment surface 55B seen from the bottom. The attachment surface 55B is a surface that faces the connector 15 of the battery pack 10. The attachment surface 55B includes a positive terminal 121, a negative terminal 122, a first work machine communication terminal 123, and a second work machine communication terminal 124. The positive terminal 121 and the negative terminal 122 are plate-shaped terminals, and each have a conductive metal portion and an insulated resin portion. The first and second work machine communication terminals 123, 124 are plate-shaped terminals made of metal.

Specifically, the positive terminal 121 includes a rear positive electrode conduction portion 121a and a front positive electrode insulated portion 121b. The negative terminal 122 includes a rear negative electrode conduction portion 122a and a front negative electrode insulated portion 122b. The positive electrode conduction portion 121a is adjacent to the positive electrode insulated portion 121b, and the negative electrode conduction portion 122a is adjacent to the negative electrode insulated portion 122b. The attachment surface 55B corresponds to one example of the work machine connector of the present disclosure.

Figure 7:
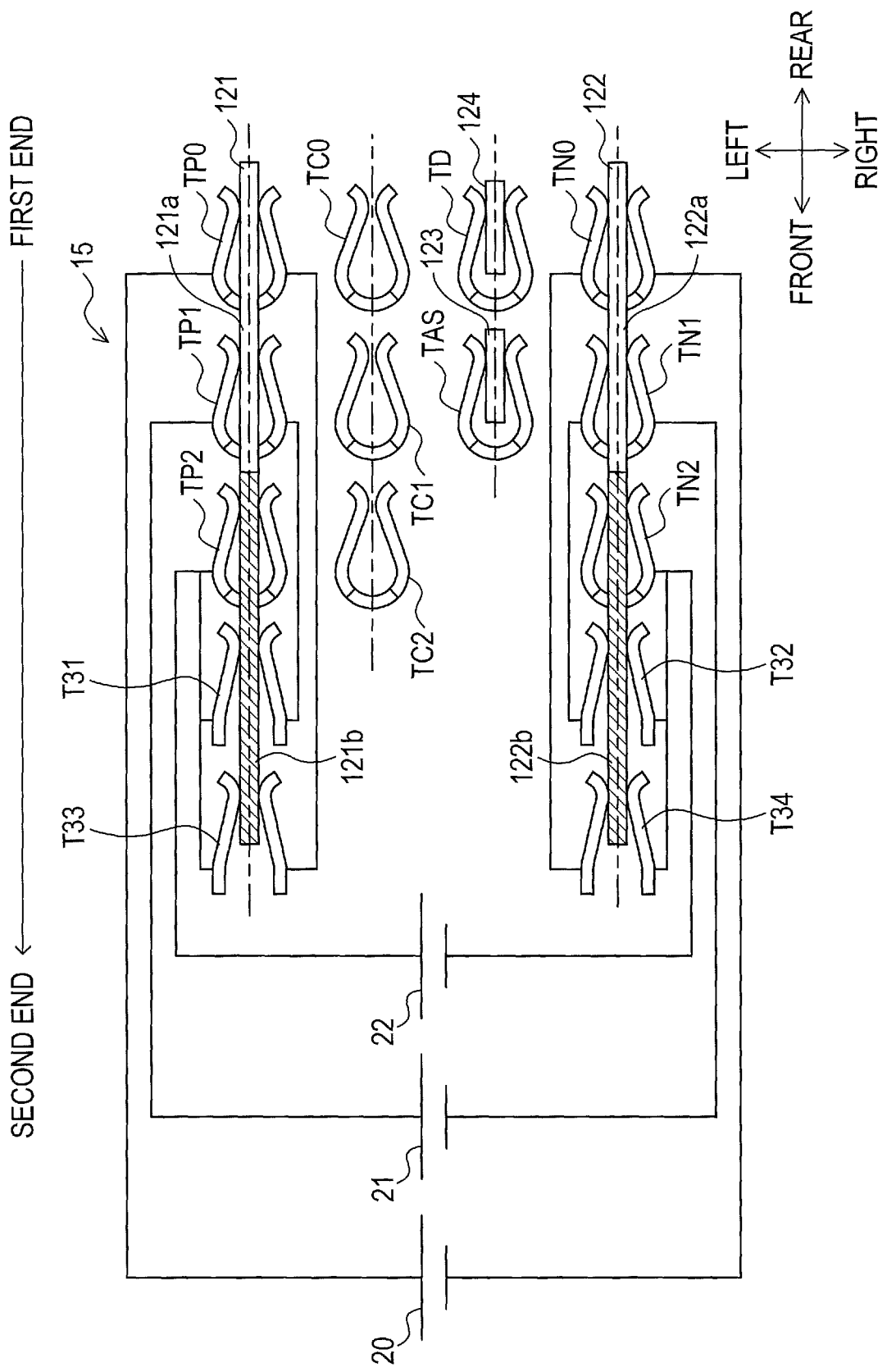
FIG. 7 is a schematic view showing a state in which the attachment portion of the second electric work machine is attached to the connector of the battery pack according to the first embodiment.

As shown in FIG. 7, the positive terminal 121 is arranged at a position corresponding to the terminal row including the first battery positive terminal TP0, and the negative terminal 122 is arranged at a position corresponding to the terminal row including the first battery negative terminal TN0. The positive electrode conduction portion 121a is configured to have a length to penetrate the first and second battery positive terminals TP0, TP1, and not to be inserted to the third battery positive terminal TP2. The negative electrode conduction portion 122a is configured in the same manner as the positive electrode conduction portion 121a. The positive electrode insulated portion 121b is configured to have a length to penetrate the third battery positive terminal TP2, the first parallel connection terminal T31, and the third parallel connection terminal 33. The negative electrode insulated portion 122b is configured in the same manner as the positive electrode insulated portion 121b.

The first and second work machine communication terminals 123, 124 are configured in the same manner as the first and second work machine communication terminals 113, 114, and are respectively arranged at positions corresponding to the first and second communication terminals TAS, TD.

As shown in FIG. 7, attachment of the battery pack 10 to the battery attachment 9 causes the positive electrode conduction portion 121a to conduct with the first and second battery positive terminals TP0, TP1. Also, the negative electrode conduction portion 122a conducts with the first and second battery negative terminals TN0, TN1. In other words, of the terminal rows on the positive electrode side and the negative electrode side of the connector 15 arranged in insertion directions of the positive terminal 121 and the negative terminal 122, the positive electrode conduction portion 121a and the negative electrode conduction portion 122a are each connected to a terminal closest to the insertion side and a terminal adjacent thereto. In addition, the first work machine communication terminal 123 conducts with the first communication terminal TAS, and the second work machine communication terminal 124 conducts with the second communication terminal TD.

Further, the first members T31a, T32a, T33a, T34a and the second members T31b, T32b, T33b, T34b of the first, second, third, and fourth parallel connection terminals T31, T32, T33, T34 are electrically disconnected. Specifically, the first battery block 20 is connected to the second battery block 21 in parallel, and connection between the first and second battery blocks 20, 21 and the third battery block 22 is disconnected. Accordingly, when the battery pack 10 is attached to the battery attachment 9, electric power of the first and second battery blocks 20, 21 connected in parallel is outputted from the connector 15 of the battery pack 10 to the second electric work machine 5.

When two battery blocks of the first and second battery blocks 20, 21 of the three battery blocks of the first, second and third battery blocks 20, 21, 22 are used, the microcomputer 30 turns on the switch 51 of the balance circuit 50 in response to a voltage difference or a remaining energy difference between the first and second battery blocks 20, 21 and the third battery block 22 exceeding the threshold. This equalizes the remaining energies of the first, second and third battery blocks 20, 21, 22.

<3-3. Configuration of Attachment Portion of Third Electric Work Machine>

The third electric work machine 5 permits a high impedance. Specifically, the third electric work machine 5 permits one battery block. Thus, an attachment surface 55C of the battery attachment 9 of the third electric work machine 5 is configured to be connected to one battery block.

Figure 8:
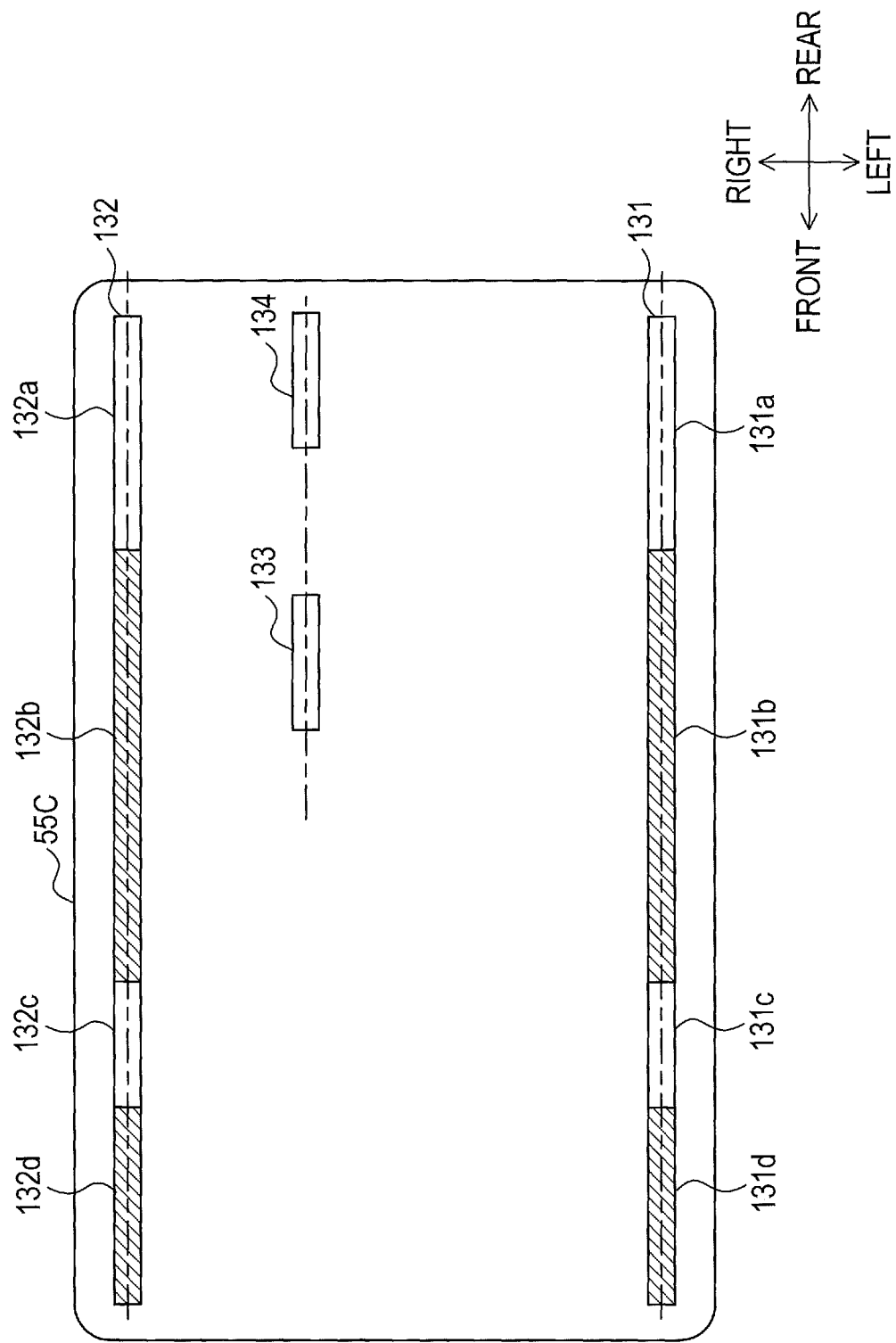
FIG. 8 is a schematic view showing a configuration of an attachment portion of a third electric work machine according to the first embodiment.

FIG. 8 is a plan view of the attachment surface 55C seen from the bottom. The attachment surface 55C is a surface that faces the connector 15 of the battery pack 10. The attachment surface 55C includes a positive terminal 131, a negative terminal 132, a first work machine communication terminal 133, and a second work machine communication terminal 134. The positive terminal 131 and the negative terminal 132 are plate-shaped terminals, and each have a conductive metal portion and an insulated resin portion. The first and second work machine communication terminals 133, 134 are plate-shaped terminals made of metal.

Specifically, the positive terminal 131 includes a first positive electrode conduction portion 131a, a first positive electrode insulated portion 131b, a second positive electrode conduction portion 131c, and a second positive electrode insulated portion 131d. The first positive electrode conduction portion 131a, the first positive electrode insulated portion 131b, the second positive electrode conduction portion 131c, and the second positive electrode insulated portion 131d are arranged in this order so that the conduction portion and the insulated portion adjacent thereto are brought into contact from the rear to the front. The negative terminal 132 includes a first negative electrode conduction portion 132a, a first negative electrode insulated portion 132b, a second negative electrode conduction portion 132c, and a second negative electrode insulated portion 132d. The first negative electrode conduction portion 132a, the first negative electrode insulated portion 132b, the second negative electrode conduction portion 132c, and the second negative electrode insulated portion 132d are arranged in this order so that the conduction portion and the insulated portion adjacent thereto are brought into contact from the rear to the front. The attachment surface 55C corresponds to one example of the work machine connector of the present disclosure.

Figure 9:
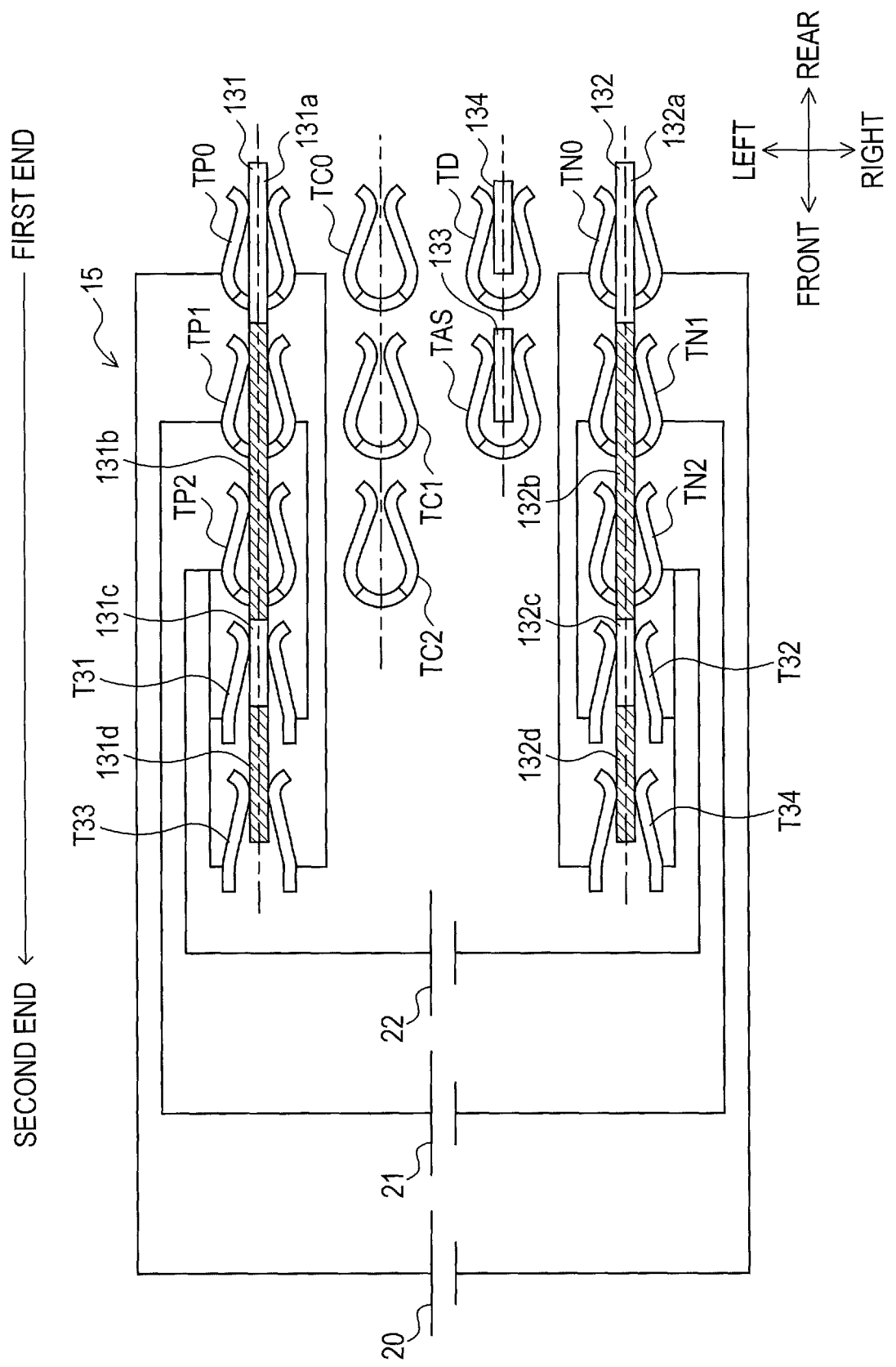
FIG. 9 is a schematic view showing a state in which the attachment portion of the third electric work machine is attached to the connector of the battery pack according to the first embodiment.

As shown in FIG. 9, the positive terminal 131 is arranged at a position corresponding to the terminal row including the first battery positive terminal TP0, and the negative terminal 132 is arranged at a position corresponding to the terminal row including the first battery negative terminal TN0. The first positive electrode conduction portion 131a is configured to have a length to penetrate the first battery positive terminal TP0, and not to be inserted to the second battery positive terminal TP1. The first negative electrode conduction portion 132a is configured in the same manner as the first positive electrode conduction portion 131a. The first positive electrode insulated portion 131b is configured to have a length to penetrate the second and third battery positive terminals TP1, TP2, and not to be inserted to the first parallel connection terminal T31. The first negative electrode insulated portion 132b is configured in the same manner as the first positive electrode insulated portion 131b.

The second positive electrode conduction portion 131c is configured to have a length to penetrate the first parallel connection terminal T31, and not to be inserted to the third parallel connection terminal 33. The second negative electrode conduction portion 132c is configured in the same manner as the second positive electrode conduction portion 131c. The second positive electrode insulated portion 131d is configured to have a length to penetrate the third parallel connection terminal 33. The second negative electrode insulated portion 132d is configured in the same manner as the second positive electrode insulated portion 131d.

The first and second work machine communication terminals 133, 134 are configured in the same manner as the first and second work machine communication terminals 113, 114, and are arranged at positions corresponding to the first and second communication terminals TAS, TD.

As shown in FIG. 9, attachment of the battery pack 10 to the battery attachment 9 causes the first positive electrode conduction portion 131a to conduct with the first battery positive terminal TP0. The first negative electrode conduction portion 132a conducts with the first battery negative terminal TN0. In other words, of terminal rows on the positive electrode side and the negative electrode side of the connector 15 arranged in insertion directions of the positive terminal 131 and the negative terminal 132, the first positive electrode conduction portion 131a and the first negative electrode conduction portion 132a are connected to terminals that are the closest to insertion sides. The first work machine communication terminal 133 conducts with the first communication terminal TAS, and the second work machine communication terminal 134 conducts with the second communication terminal TD.

Further, the first members T31a, T32a of the first and second parallel connection terminals T31, T32 conduct with and the second members T31b, T32b thereof, and the first members T33a, T34a of the third and fourth parallel connection terminal T33, T34 are electrically disconnected from the second members T33b, T34b. Specifically, the second battery block 21 and the third battery block 22 are connected in parallel to each other via the first and second parallel connection terminals T31, T32, the second battery positive terminal TP1, and the second battery negative terminal TN1. Also, connection between the second and third battery blocks 21, 22 and the first battery block 20 is disconnected. Accordingly, attachment of the battery pack 10 to the battery attachment 9 causes electric power of only the first battery block 20 to be outputted from the connector 15 of the battery pack 10 to the third electric work machine 5.

The second positive electrode conduction portion 131c may be formed into a hole, and the first member T31a may directly contact the second member T31b to conduct with the second member T31b. Similarly, the second negative electrode conduction portion 132c may be formed into a hole, and the first member T32a may directly contact with the second member T32b to conduct with the second member T32b.

In a case of using the first battery block 20 of the three battery blocks of the first, second and third battery blocks 20, 21, 22, the microcomputer 30 turns on the switch 51 of the balance circuit 50 in response to the voltage difference or the remaining energy difference between the first battery block 20 and the third battery block 22 exceeding the threshold. This equalizes the remaining energies of the first, second and third battery blocks 20, 21, 22. Specifically, parallel connection between the unused second and third battery blocks 21, 22 allows equalization of the remaining energies of the first, second and third battery blocks 20, 21, 22 using one balance circuit 50.

<3-4. Configuration of Attachment Portion of Charger>

Figure 10:
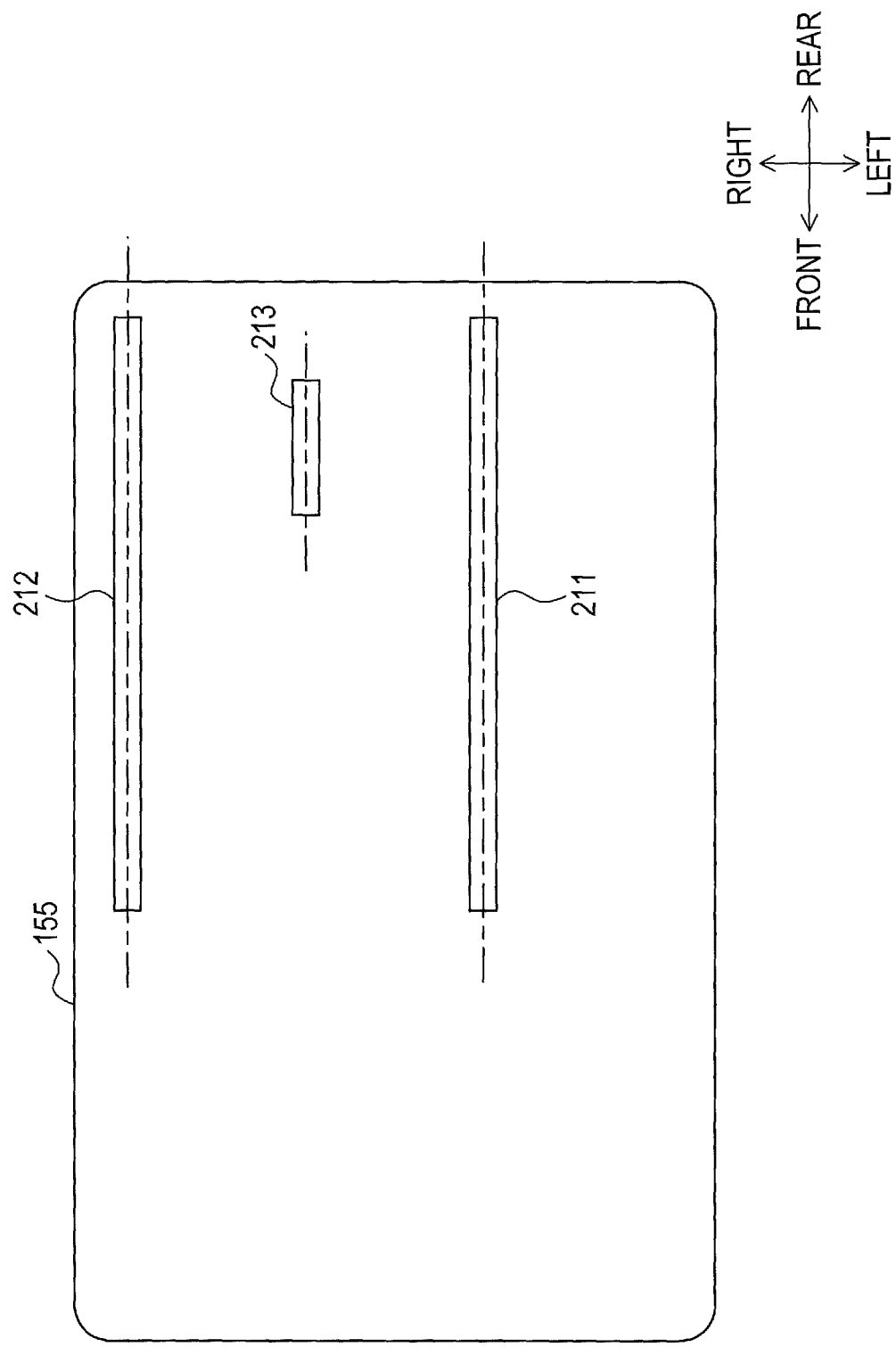
FIG. 10 is a schematic view showing a configuration of an attachment portion of a charger according to the first embodiment.

FIG. 10 is a plan view of an attachment surface 155 of the charger seen from the bottom. The attachment surface 155 is a surface that faces the connector 15 of the battery pack 10. The attachment surface 155C includes a charger positive terminal 211, a charger negative terminal 212, and a charger communication terminal 213. Each terminal is a plate-shaped terminal made of metal.

The charger positive terminal 211 is arranged at a position corresponding to a terminal row including the first charging terminal TC0. The charger positive terminal 211 is configured to have a length to penetrate the first and second charging terminals TC0, TC1, and pass dents of the third charging terminal TC2 but not to penetrate the third charging terminal TC2. The charger negative terminal 212 is arranged at a position corresponding to the terminal row including the first battery negative terminal TN0. The charger negative terminal 212 is configured to have a length to penetrate the first and second battery negative terminals TN0, TN1, and pass the dents of the third battery negative terminal TN2 but not to penetrate the third battery negative terminal TN2.

The charger communication terminal 213 is arranged at a position corresponding to the second communication terminal TD. The charger communication terminal 213 is configured to be longer than the distance from the insertion opening of the second communication terminal TD to the dents of the second communication terminal TD.

Attachment of the battery pack 10 to the attachment portion of the charger causes the charger positive terminal 211 to conduct with the first, second and third charging terminals TC0, TC1, TC2. The charger negative terminal 212 also conducts with the first, second and third battery negative terminals TN0, TN1, TN2. In addition, the charger communication terminal 213 conducts with the second communication terminal TD. As a result, the first, second and third battery blocks 20, 21, 22 are charged while the charger and the battery pack 10 communicate with each other.

<4. Effect>

According to the above-described first embodiment, effects as below are obtained.

(1) By changing the number of battery blocks of the first, second and third battery blocks 20, 21, 22 that conduct with the positive terminals 111, 121, 131 and the negative terminals 112, 122, 132 of the electric work machine 5, the impedance of the battery pack 10 can be changed. Accordingly, by causing the number of battery blocks corresponding to the configurations of the positive terminals 111, 121, 131 and the negative terminals 112, 122, 132 of the electric work machine 5 to conduct with the electric work machine 5, the impedance of the battery pack 10 can be adjusted in accordance with the electric work machine 5. Specifically, the battery pack 10 excellent in versatility can be implemented while loss of electric power is reduced.

(2) In a case of supplying electric power from the first battery block 20 of the first, second and third battery blocks 20, 21, 22 to the electric work machine 5, the remaining second battery block 21 and third battery block 22 are connected in parallel to each other. Accordingly, the remaining energies of the second battery block 21 and the third battery block 22 can be equalized. Further, the remaining energies of the first battery block 20 and the third battery block 22 can be equalized by the balance circuit 50. Accordingly, the remaining energies of the first, second and third battery blocks 20, 21, 22 can be equalized. Also, in a case of supplying electric power from the second and third battery blocks 20, 21 of the first, second and third battery blocks 20, 21, 22 to the electric work machine 5, the remaining energies of the first, second and third battery blocks 20, 21, 22 can be equalized. Accordingly, the remaining energies of the first, second and third battery blocks 20, 21, 22 can be equalized using a minimum number of balance circuits 50.

Second Embodiment

<1. Difference from First Embodiment>

The second embodiment has the same basic configuration as the first embodiment. Thus, the description on the common configuration is not repeated, and the difference will be mainly described. The same reference numerals as those of the first embodiment indicate the same configurations and references are made to the preceding descriptions.

In the aforementioned first embodiment, the positive terminals 111, 121, 131 and the negative terminals 112, 122, 132 arranged on the battery attachment 9 of the electric work machine 5 are configured in accordance with the specific number of battery blocks permissible to the electric work machine 5. Thus, when the battery pack 10 is attached to the battery attachment 9 of the electric work machine 5, the specific number of battery blocks of the first, second and third battery blocks 20, 21, 22 permissible to the electric work machine 5 are connected to the electric work machine 5.

In contrast, in the second embodiment, regardless of the specific number of battery blocks permissible to the electric work machine 5, the battery attachment 9 of the electric work machine 5 has the same configuration. Specifically, the battery attachment 9 of the electric work machine 5 according to the second embodiment includes the attachment surface 55A provided with the positive terminal 111, the negative terminal 112, the first work machine communication terminal 113, and the second work machine communication terminal 114. The second embodiment differs from the first embodiment in that the microcomputer 30 varies the number of battery blocks that conduct with the positive terminal 111 and the negative terminal 112 of the electric work machine 5 by controlling ON and OFF of the protection FETs 590, 591, 592 depending on the specific number of battery blocks permissible to the electric work machine 5.

<2. Configuration of Battery Pack>

Figure 11:
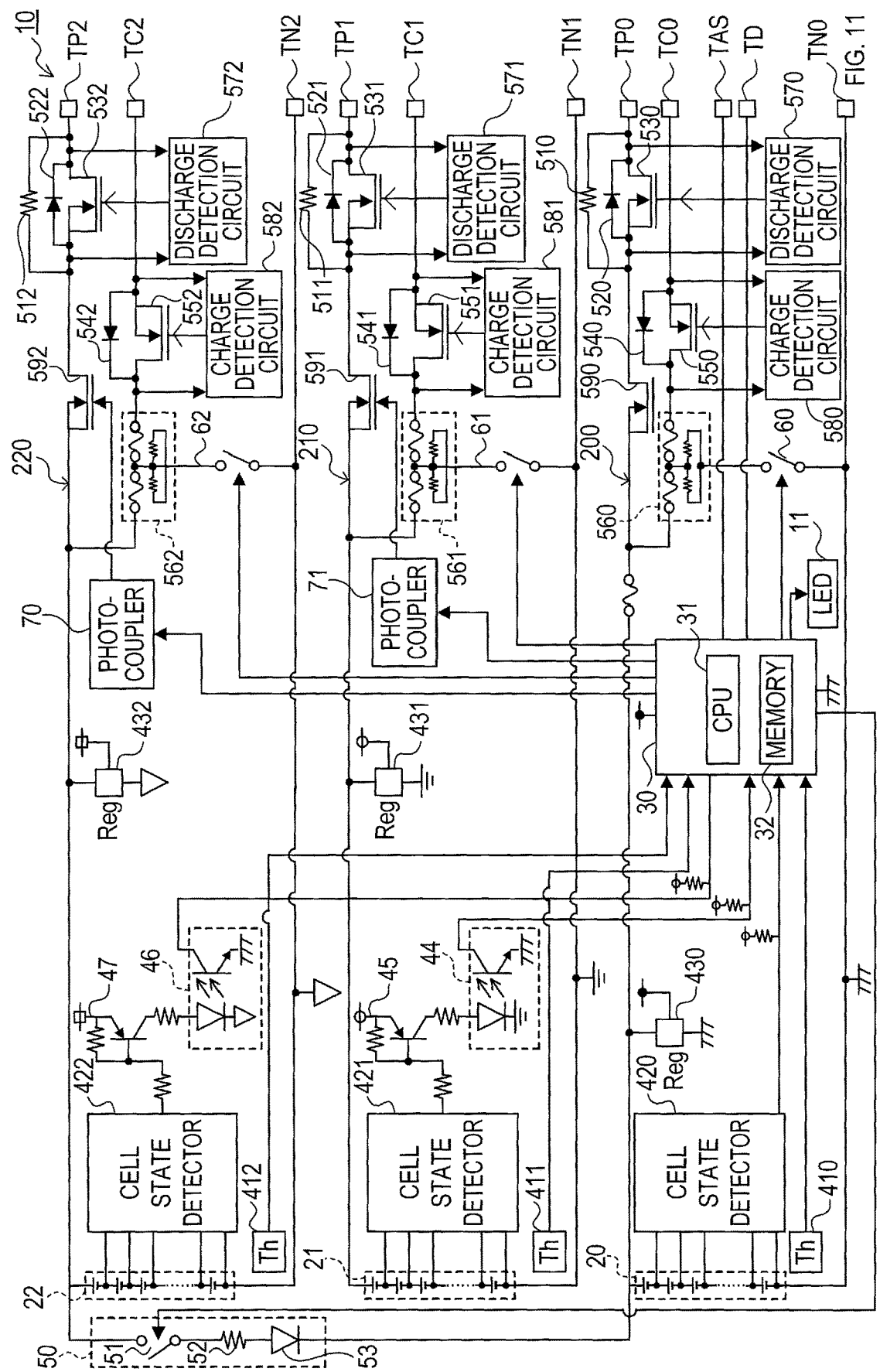
FIG. 11 is block diagram showing a circuit configuration of a battery pack according to a second embodiment.

FIG. 11 shows a configuration of the first, second and third battery circuits 200, 210, 220. The second and third battery circuits 210, 220 respectively include photocouplers 70, 71, in addition to the configuration of the second and third battery circuits 210, 220 of the first embodiment. The microcomputer 30 outputs an ON-command signal or an OFF-command signal to gate terminals of the protection FETs 590, 591 via the photocouplers 70, 71. Accordingly, the microcomputer 30 controls ON and OFF of the protection FETs 590, 591 in a state where the second and third battery blocks 21, 22 are insulated from the microcomputer 30.

<3. Discharge Process>

Figure 12:
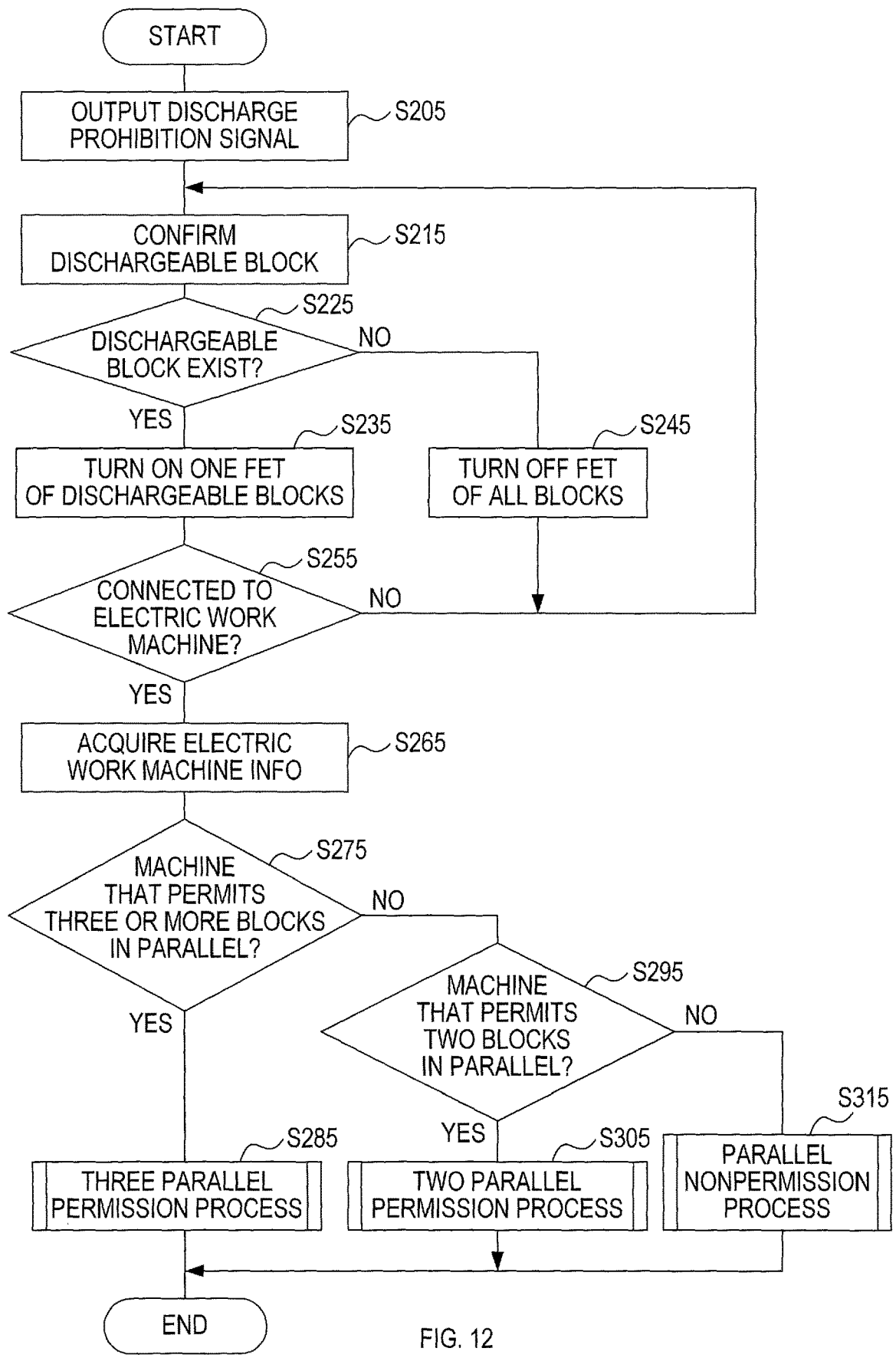
FIG. 12 is a flowchart illustrating a discharge process executed by a microcomputer of the battery pack according to the second embodiment.

Next, a description will be given on a discharge process executed by the microcomputer 30 with reference to a flowchart of FIG. 12. The microcomputer 30, while being awake, repeats the present process at a specific cycle.

First, in S205, all the protection FETs 590, 591, 592 are turned off, and the discharge prohibition signal for prohibiting discharge is outputted to the electric work machine 5 via the first communication terminal TAS.

Subsequently, in S215, it is confirmed whether the first, second and third battery blocks 20, 21, 22 are dischargeable. Specifically, it is confirmed whether each of the first, second and third battery blocks 20, 21, 22 is dischargeable based on the battery voltage, the cell temperature and the like.

Subsequently, in S225, it is determined whether there is a dischargeable battery block among the first, second and third battery blocks 20, 21, 22. When it is determined that at least one of the first, second and third battery blocks 20, 21, 22 is dischargeable, the process proceeds to S235. When it is determined that all of the battery blocks are not dischargeable, the process proceeds to S245.

In S235, one of the protection FETs 590, 591, 592 is turned on. The one protection FET corresponds to any one battery block determined dischargeable in S225. As a result, supply of an electric power from the battery pack 10 to the electric work machine 5 is started with the impedance of the battery pack 10 set to be the highest. This awakes the controller included in the electric work machine 5, and allows a communication between the battery pack 10 and the electric work machine 5. Thereafter, the process proceeds to S255.

On the other hand, in S245, the protection FETs 590, 591, 592 corresponding to all the first, second and third battery blocks 20, 21, 22 are turned off, and the process returns to S215.

In S255, it is determined whether the battery pack 10 is connected to the electric work machine 5. When it is determined that the battery pack 10 is connected to the electric work machine 5, the process proceeds to S265. When it is determined that the battery pack 10 is not connected to the electric work machine 5, the process returns to S215.

In S265, the electric work machine information is acquired from the electric work machine 5 via the second communication terminal TD. The electric work machine information may be an impedance permissible to the electric work machine 5, or may be a specific number of battery blocks permissible to the electric work machine 5. The microcomputer 30, when acquiring the permissible impedance as the electric work machine information, determines a maximum number of battery blocks that can conduct with the positive terminal 111 and the negative terminal 112 of the electric work machine 5. The maximum number corresponds to the number of battery blocks that makes an impedance when the maximum number of battery blocks are connected in parallel equal to or higher than the acquired impedance.

In S275, based on the electric work machine information acquired in S265, it is determined whether the electric work machine 5 permits three or more battery blocks connected in parallel to each other. Specifically, it is determined whether the maximum number of battery blocks that can be connected to the electric work machine 5 is three or more. When it is determined in S275 that the electric work machine 5 permits three or more battery blocks connected in parallel to each other, the process proceeds to S285, and a three parallel permission process is executed. Detail of the three parallel permission process will be described later.

When it is determined in S275 that the electric work machine 5 does not permit three or more battery blocks connected in parallel to each other, it is determined in S295 whether the electric work machine 5 permits two battery blocks connected in parallel to each other. Specifically, it is determined whether the maximum number of battery blocks that can be connected to the electric work machine 5 is two. When it is determined in S295 that the electric work machine 5 permits two battery blocks connected in parallel to each other, the process proceeds to S305, and a two parallel permission process is executed. Detail of the two parallel permission process will be described later.

When it is determined in S295 that the electric work machine 5 does not permit two battery blocks connected in parallel to each other, specifically when it is determined that the maximum number of battery blocks that can be connected to the electric work machine 5 is one, a parallel nonpermission process is executed in S315. Detail of the parallel nonpermission process will be described later.

When the impedance permissible to the electric work machine 5 is higher than the respective impedance of the first, second and third battery blocks 20, 21, 22, and none of the battery blocks can be connected, all the protection FETs 590, 591, 592 may be turned off. Alternatively, the battery pack 10 may be configured so as not to be connected to the battery attachment 9 of such electric work machine 5.

<3-1. Three Parallel Permission Process>

Figure 13A:
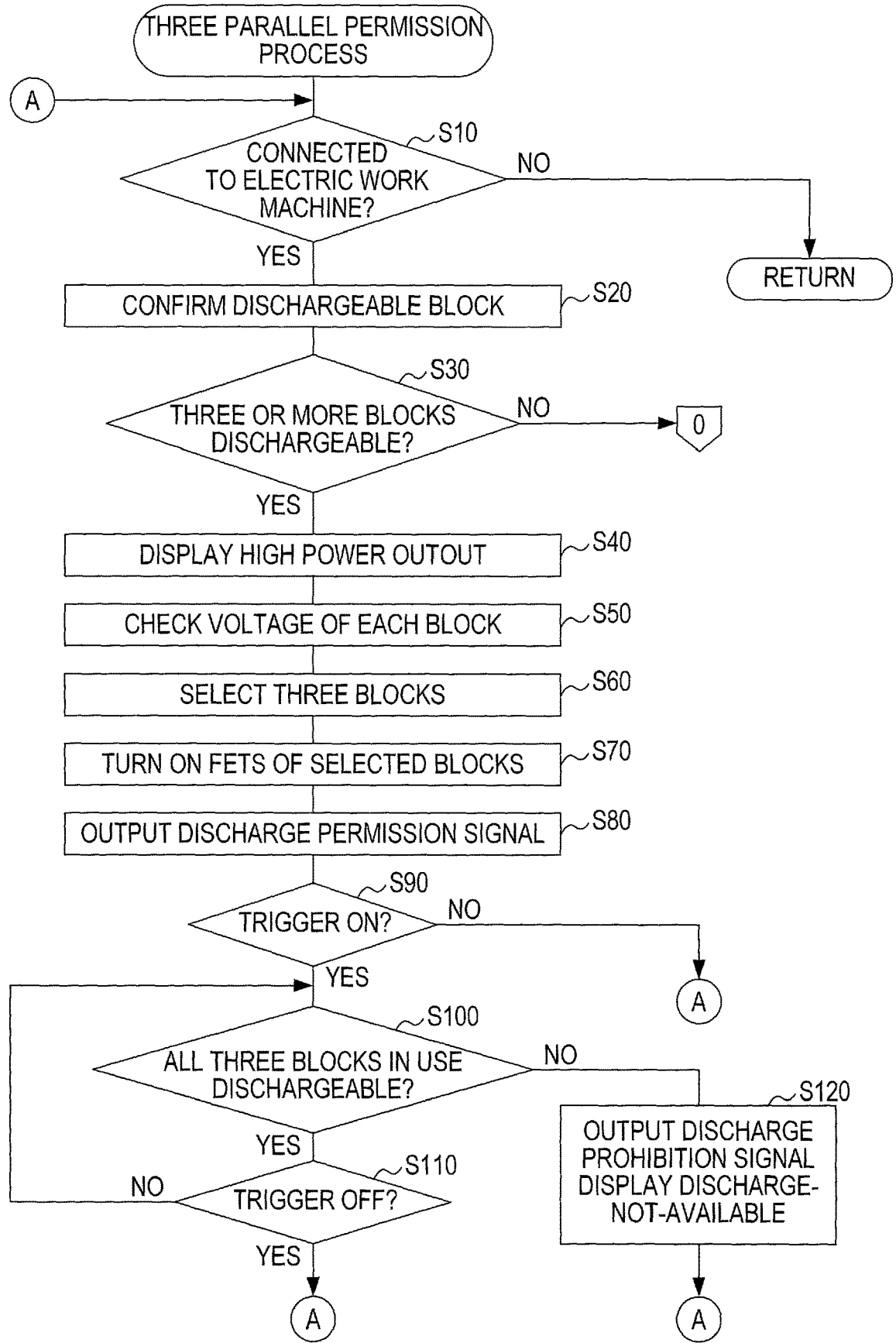
FIG. 13A is a part of a flowchart of a three parallel permission process executed by the microcomputer of the battery pack according to the second embodiment.
Figure 13B:
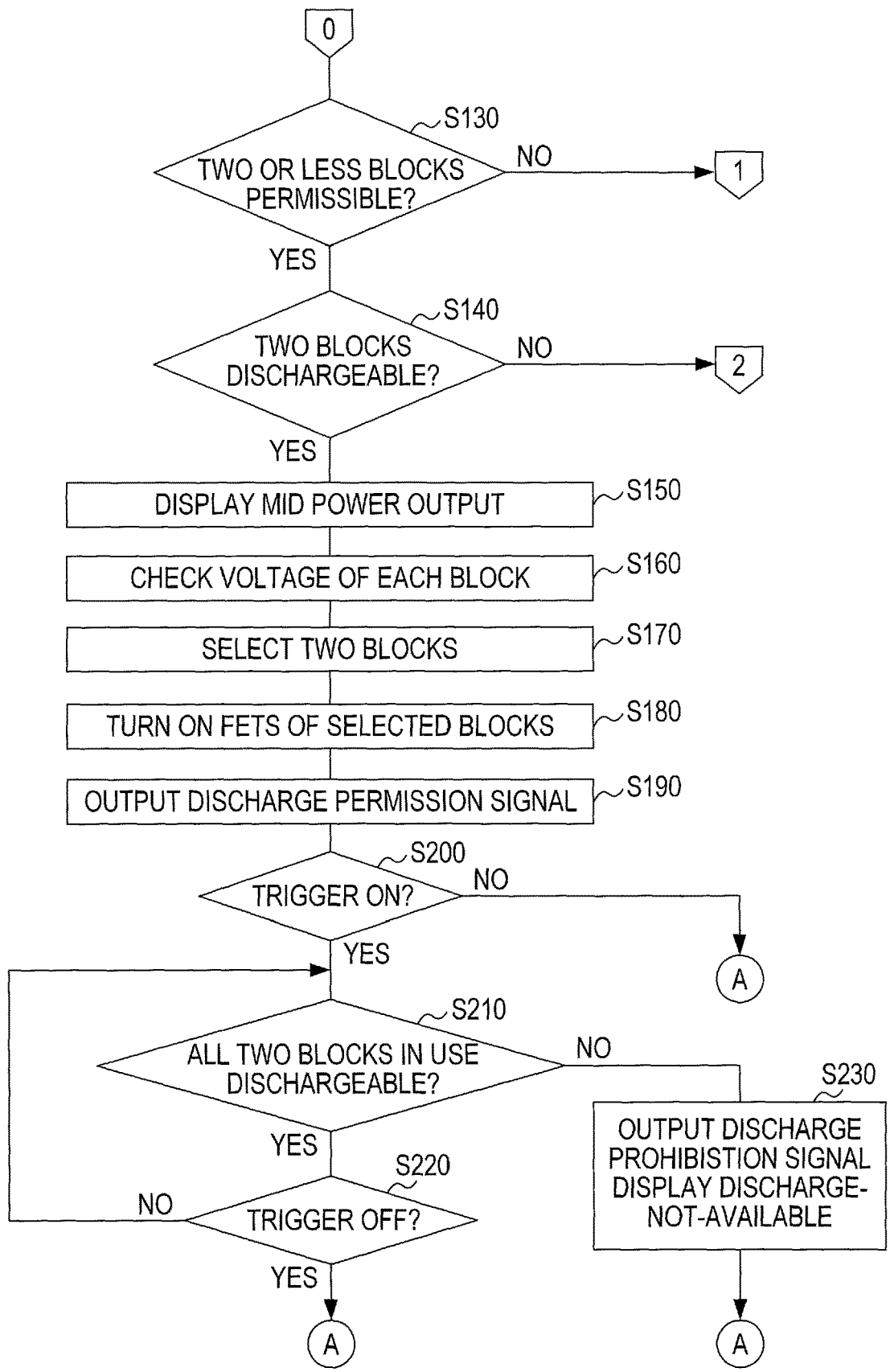
FIG. 13B is another part of the flowchart of the three parallel permission process executed by the microcomputer of the battery pack according to the second embodiment.
Figure 13C:
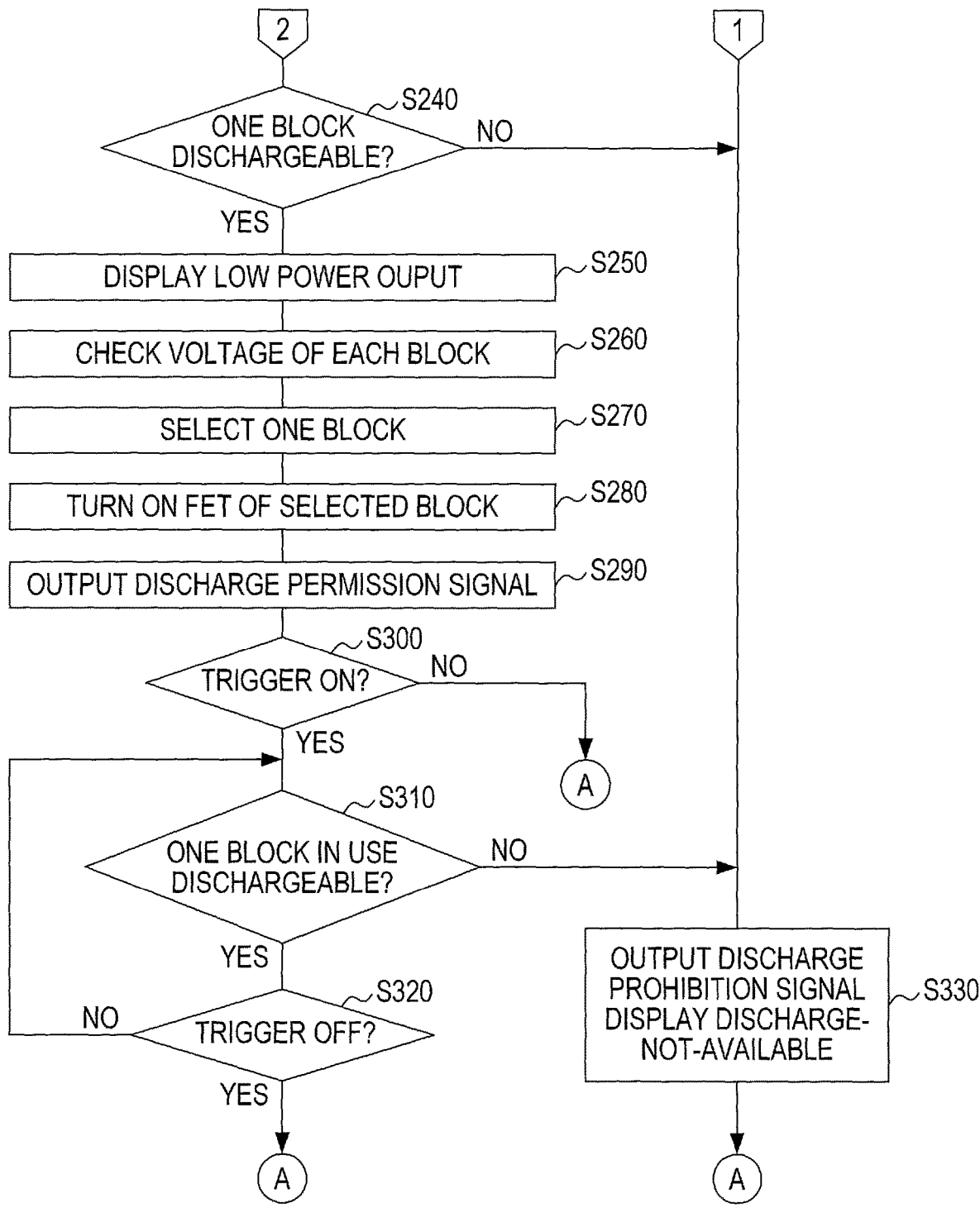
FIG. 13C is a remaining part of the three parallel permission process executed by the microcomputer of the battery pack according to the second embodiment.

Next, a description will be given on the three parallel permission process executed by the microcomputer 30 with reference to flowcharts in FIGS. 13A, 13B and 13C.

First, in S10, it is determined whether the battery pack 10 is connected to the electric work machine 5. When it is determined that the battery pack 10 is connected to the electric work machine 5, the process proceeds to S20. When it is determined that the battery pack 10 is not connected to the electric work machine 5, the process returns to S205.

In S20, it is confirmed whether the first, second and third battery blocks 20, 21, 22 are dischargeable.

In S30, it is determined whether three or more of the first, second and third battery blocks 20, 21, 22 are dischargeable. When it is determined in S30 that three or more battery blocks are dischargeable, the process proceeds to S40.

In S40, in order to provide a notification of a high power output state in which the first, second and third battery blocks 20, 21, 22 are used, a high power output notification command is outputted to the electric work machine 5 via the second communication terminal TD. As a result, "high power output" is displayed on the device display 8 of the electric work machine 5. Also, "high power output" is displayed on the battery indicator 11. Notification of "high power output" corresponds to one example of a first notification of the present disclosure, and the high power output notification command corresponds to one example of a first command of the present disclosure.

next, in S50, the voltage of each of first, second and third battery blocks 20, 21, 22 is checked.

next, in S60, three battery blocks with higher voltage values are selected from the dischargeable battery blocks of the battery blocks included in the battery pack 10. In the present embodiment, the battery pack 10 includes only the first, second and third battery blocks 20, 21, 22, and thus the first, second and third battery blocks 20, 21, 22 are selected. If the battery pack 10 includes four or more battery blocks, then three battery blocks are selected therefrom.

Next, in S70, the protection FETs corresponding to the three battery blocks selected in S60 are turned on. In the present embodiment, the protection FETs 590, 591, 592 corresponding to the first, second and third battery blocks 20, 21, 22 are turned on.

Subsequently, in S80, the discharge permission signal for permitting discharge is outputted to the electric work machine 5 via the first communication terminal TAS.

Subsequently, in S90, it is determined whether the trigger 2 is ON, that is, the trigger 2 is pulled by the user. When it is determined in S90 that the trigger 2 is ON, the process proceeds to S100. When it is determined that the trigger 2 is OFF, the process returns to S10.

In S100, it is determined whether all the first, second and third battery blocks 20, 21, 22 in use are dischargeable. When it is determined in S100 that all the first, second and third battery blocks 20, 21, 22 in use are dischargeable, the process proceeds to S110.

In S110, it is determined whether the trigger 2 is OFF. When it is determined in S110 that the trigger 2 is OFF, the process returns to S10. When it is determined in S110 that the trigger 2 is ON, the process returns to S100.

Figure 18:
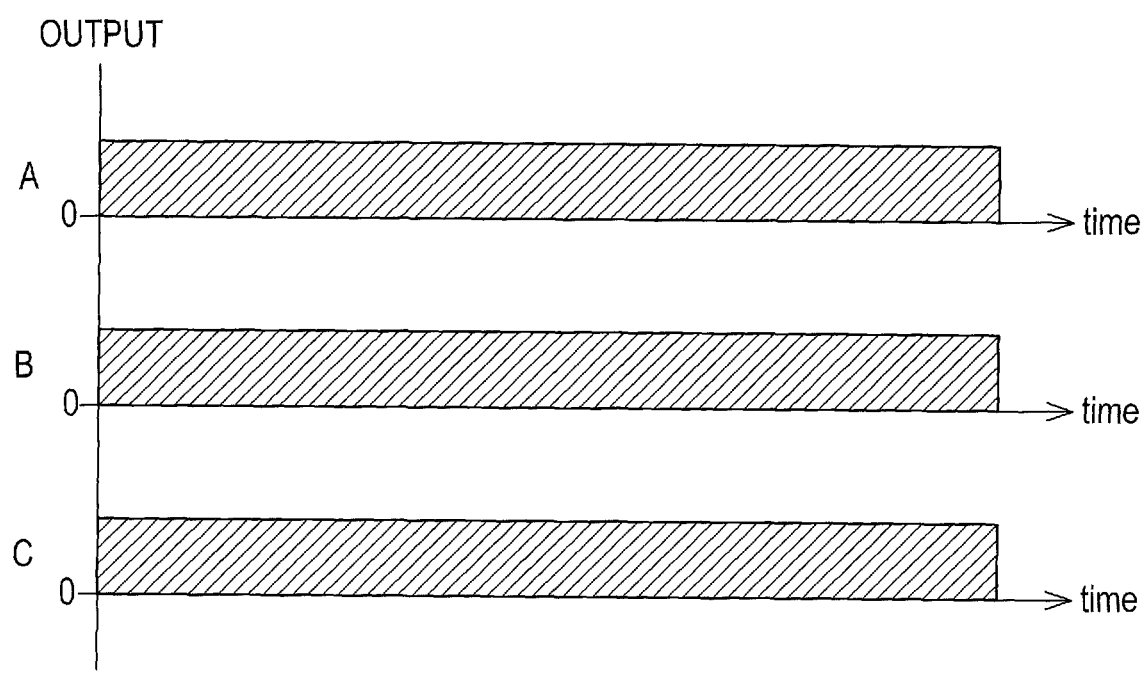
FIG. 18 is a time chart showing changes in outputs of the respective battery blocks, when three battery blocks of the battery pack according to the second embodiment are used.

FIG. 18 shows a time variation of outputs of the respective battery blocks when discharges from the first, second and third battery blocks 20, 21, 22 are continued. The battery blocks A, B, C correspond to the first, second and third battery blocks 20, 21, 22.

On the other hand, when it is determined in S100 that at least one of the first, second and third battery blocks 20, 21, 22 in use is not dischargeable, the process proceeds to S120.

In S120, the discharge prohibition signal is outputted to the electric work machine 5 via the first communication terminal TAS. Further, in order to provide a discharge-not-available notification, a discharge-not-available notification command is outputted to the electric work machine 5 via the second communication terminal TD. As a result, discharge-not-available is displayed on the device display 8 of the electric work machine 5. Also, discharge-not-available is displayed on the battery indicator 11.

If the output is changed during the use of the electric work machine 5, a problem may occur in using the electric work machine 5. Thus, even if one or two of the first, second and third battery blocks 20, 21, 22 are dischargeable, the number of battery blocks to use is not changed from when the trigger 2 is turned off once until the trigger 2 is turned on again.

Also, when it is determined in S30 that two or less battery blocks are dischargeable, the process proceeds to S130.

In S130, it is determined whether the electric work machine 5 permits use of two or less battery blocks. Depending on the type of the electric work machine 5, use of two or less battery blocks is not permitted since a problem occurs in use with reduced output.

When it is determined in S130 that use of two or less battery blocks is permitted, the process proceeds to S140. On the other hand, when it is determined in S130 that use of two or less battery blocks is not permitted, the process proceeds to S330, and the same step as S120 is executed.

In S140, it is determined whether two of the first, second and third battery blocks 20, 21, 22 are dischargeable. When it is determined in S140 that two battery blocks are dischargeable, the process proceeds to S150.

In S150, in order to provide a notification of a medium power output state in which two of the first, second and third battery blocks 20, 21, 22 are used, a medium power output notification command is outputted to the electric work machine 5 via the second communication terminal TD. As a result, medium power output is displayed on the device display 8 of the electric work machine 5. Also, medium power output is displayed on the battery indicator 11. Notification of medium power output corresponds to a second notification of the present disclosure, and the medium power output notification command corresponds to a second command of the present disclosure.

Next, in S160, the voltage of each of the first, second and third battery blocks 20, 21, 22 is checked.

Next, in S170, two battery blocks with higher voltage values are selected from the dischargeable battery blocks of the first, second and third battery blocks 20, 21, 22.

Next, in S180, the protection FETs corresponding to the two battery blocks selected in S170 of the protection FETs 590, 591, 592 are turned on.

Subsequently, in S190, the discharge permission signal to permit discharge is outputted to the electric work machine 5 via the first communication terminal TAS.

Subsequently, in S200, it is determined whether the trigger 2 is ON. When it is determined in S200 that the trigger 2 is ON, the process proceeds to S210. When it is determined that the trigger 2 is OFF, the process returns to S10.

In S210, it is determined whether the two battery blocks in use are dischargeable. When it is determined in S210 that the two battery blocks in use are dischargeable, the process proceeds to S220.

In S220, it is determined whether the trigger 2 is OFF. When it is determined in S220 that the trigger 2 is OFF, the process returns to S10. When it is determined in S220 that the trigger 2 is ON, the process returns to S210.

On the other hand, in S210, when it is determined that at least one of the two battery blocks in use is not dischargeable, the process proceeds to S230, and the same step as S120 is executed.

Also, in S140, when it is determined that one or less battery blocks are dischargeable, the process proceeds to S240.

In S240, it is determined whether one battery block is dischargeable. When it is determined in S240 that one battery block is dischargeable, the process proceeds to S250. On the other hand, when it is determined in S240 that there is no dischargeable battery block, the process proceeds to S330, and the same step as S120 is executed.

In S250, in order to provide a notification of a low power output state in which one of the first, second and third battery blocks 20, 21, 22 is used, a low power output notification command is outputted to the electric work machine 5 via the second communication terminal TD. As a result, "low power output" is displayed on the device display 8 of the electric work machine 5. Also, "low power output" is displayed on the battery indicator 11. Notification of "low power output" corresponds to one example of the second notification of the present disclosure, and the low power output notification command corresponds to one example of the second command of the present disclosure.

Next, in S260, the voltage of each of the first, second and third battery blocks 20, 21, 22 is checked.

Next, in S270, one battery block with a higher voltage value is selected from the dischargeable battery blocks of the first, second and third battery blocks 20, 21, 22.

Next, in S280, the protection FET corresponding to the one battery block selected in S270 of the protection FETs 590, 591, 592 is turned on.

Next, in S290, the discharge permission signal for permitting discharge is outputted to the electric work machine 5 via the first communication terminal TAS.

Subsequently, in S300, it is determined whether the trigger 2 is ON. When it is determined in S300 that the trigger 2 is ON, the process proceeds to S310. When it is determined that the trigger 2 is OFF, the process returns to S10.

In S310, it is determined whether the one battery block in use is dischargeable. When it is determined in S310 that the one battery block in use is dischargeable, the process proceeds to S320.

In S320, it is determined whether the trigger 2 is OFF. When it is determined in S320 that the trigger 2 is OFF, the process returns to S10. When it is determined in S320 that the trigger 2 is ON, the process returns to S310.

On the other hand, when it is determined in S310 that the one battery block in use is not dischargeable, the process proceeds to S330, and the same step as S120 is executed.

<3-2. Two Parallel Permission Process>

Figure 14A:
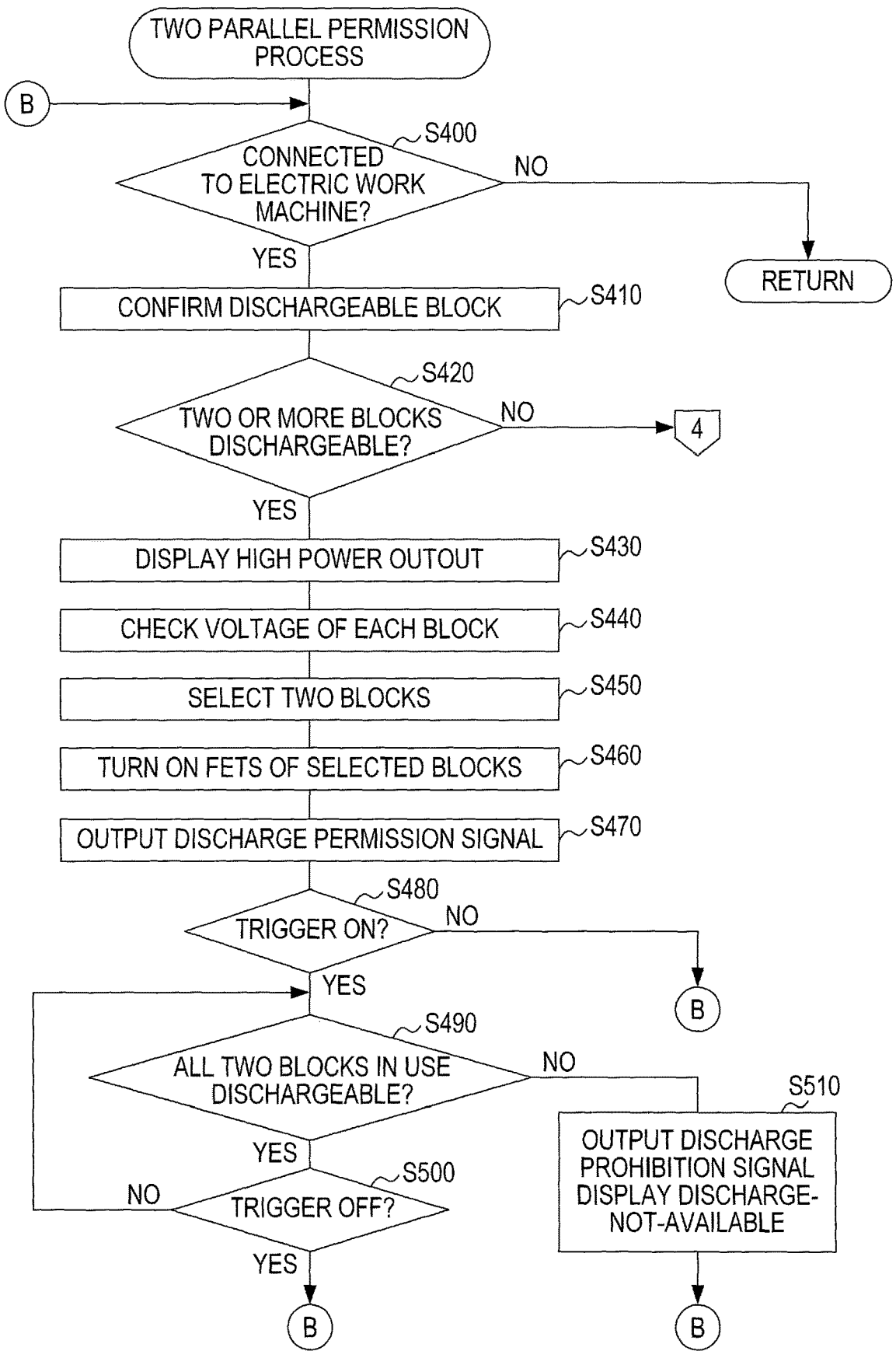
FIG. 14A is a part of a flowchart of a two parallel permission process executed by the microcomputer of the battery pack according to the second embodiment.
Figure 14B:
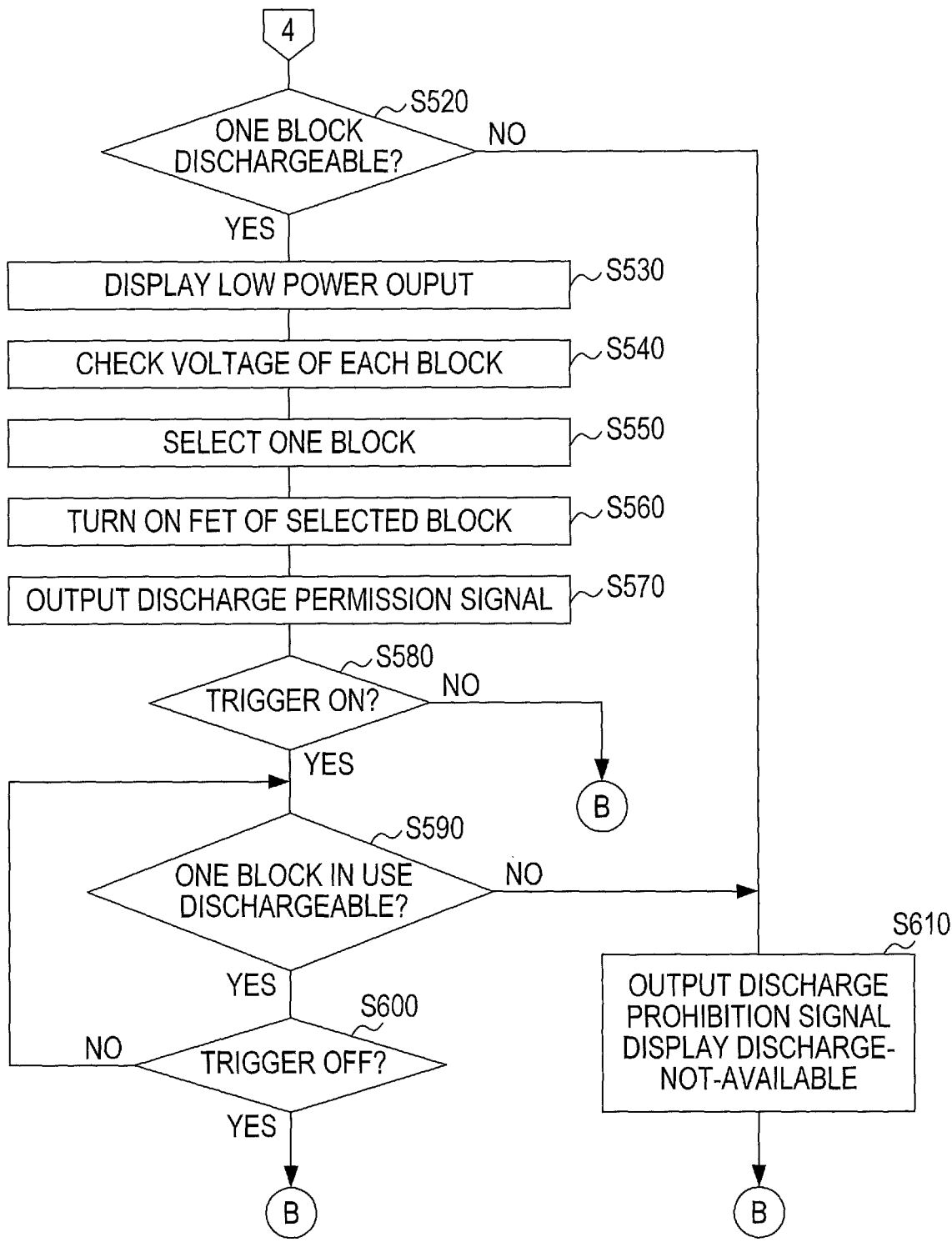
FIG. 14B is a remaining part of the flowchart of the two parallel permission process executed by the microcomputer of the battery pack according to the second embodiment.

Next, a description will be given on the two parallel permission process executed by the microcomputer 30 with reference to flowcharts of FIGS. 14A and 14B.

First, in S400 and S410, the same steps as S10 and S20 are executed.

Subsequently, in S420, it is determined whether two or more battery blocks of the first, second and third battery blocks 20, 21, 22 are dischargeable. When it is determined in S420 that two or more battery blocks are dischargeable, the process proceeds to S430.

Subsequently, in S430, in order to provide a notification of a high power output state in which two of the first, second and third battery blocks 20, 21, 22 are used, a high power output notification command is outputted to the electric work machine 5 via the second communication terminal TD. As a result, "high power output" is displayed on the device display 8 of the electric work machine 5. Also, "high power output" is displayed on the battery indicator 11. In the electric work machine 5 that permits two battery blocks connected in parallel to each other, a state in which the maximum number of two battery blocks are used is referred to as high power output state.

Subsequently, in S440 to S510, the same steps as S160 to S230 are executed.

Also, when it is determined in S420 that one or less battery blocks are dischargeable, the process proceeds to S520.

In S520, it is determined whether one battery block is dischargeable. When it is determined in S520 that one battery block is dischargeable, the process proceeds to S530. On the other hand, when it is determined in S520 that there is no dischargeable battery block, the process proceeds to S610, and the same step as S120 is executed.

In S530, in order to provide a notification of a medium power output state in which one of the first, second and third battery blocks 20, 21, 22 is used, a medium power output notification command is outputted to the electric work machine 5 via the second communication terminal TD. As a result, "medium power output" is displayed on the device display 8 of the electric work machine 5. Also, "medium power output" is displayed on the battery indicator 11. Subsequently, in S540 to S610, the same steps as S260 to S330 are executed. Notification of medium power output corresponds to one example of the second notification of the present disclosure, and the medium power output notification command corresponds to one example of the second command of the present disclosure.

<3-3. Parallel Nonpermission Process>

Figure 15:
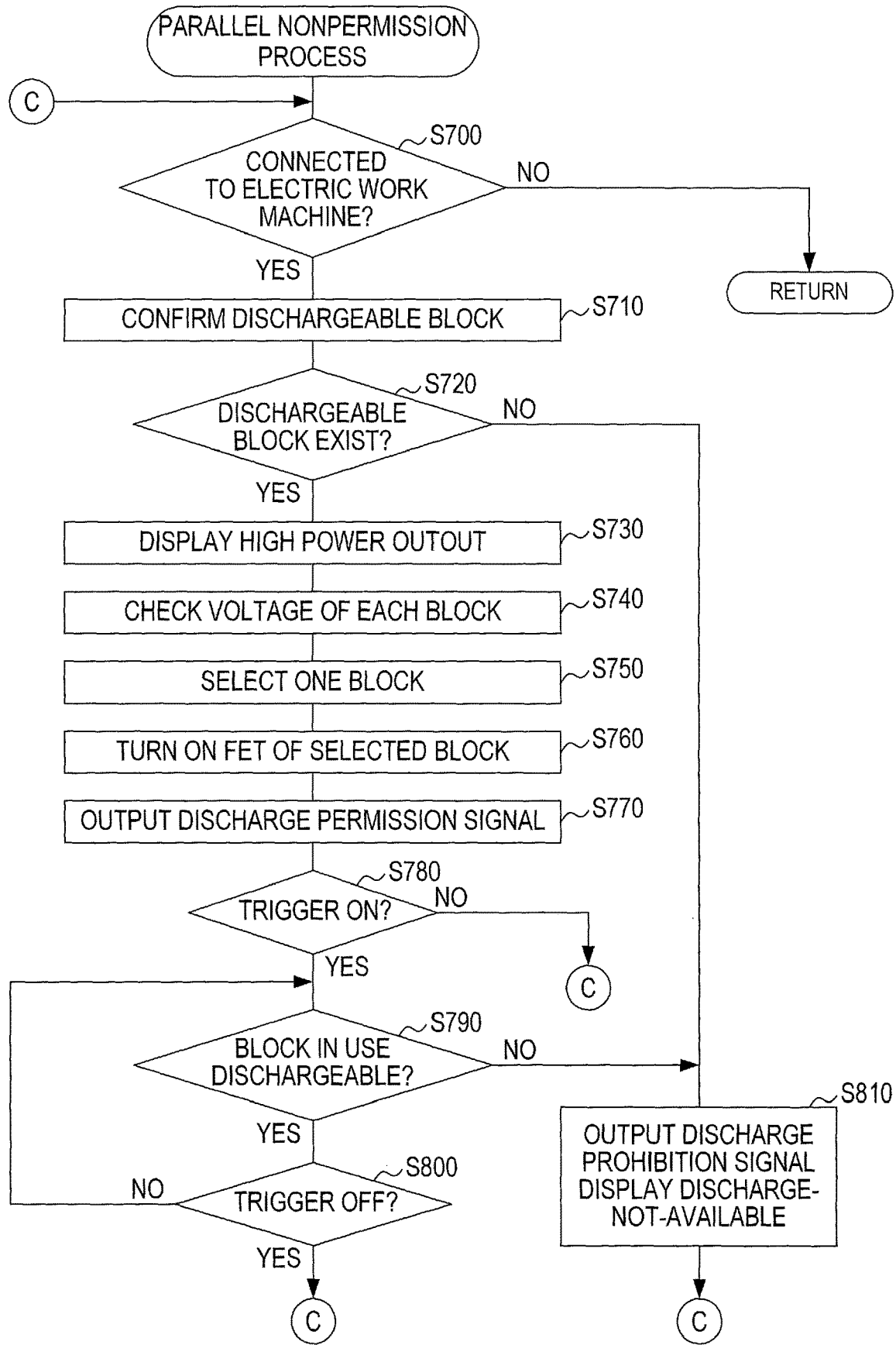
FIG. 15 is a flowchart of a parallel nonpermission process executed by the microcomputer of the battery pack according to the second embodiment.

Next, a description will be given on the parallel nonpermission process executed by the microcomputer 30 with reference to a flowchart of FIG. 15.

First, in S700 and S710, the same steps as S10 and S20 are executed.

Subsequently, in S720, it is determined whether there is a dischargeable battery block in the first, second and third battery blocks 20, 21, 22. When it is determined in S720 that there is a dischargeable battery block, the process proceeds to S730. On the other hand, when it is determined in S520 that there is no dischargeable battery block, the process proceeds to S810, and the same step as S120 is executed.

In S730, in order to provide a notification of a high power output state in which one of the first, second and third battery blocks 20, 21, 22 is used, a high power output notification command is outputted to the electric work machine 5 via the second communication terminal TD. As a result, "high power output" is displayed on the device display 8 of the electric work machine 5. Also, "high power output" is displayed on the battery indicator 11. In the electric work machine 5 that permits only one battery block, a state in which the maximum number of one battery block is used is referred to as high power output state. Subsequently, in S740 to S810, the same steps as S260 to S330 are executed. Notification of high power output corresponds to one example of the first notification of the present disclosure, and the high power output notification command corresponds to one example of the first command of the present disclosure.

<4. Another Example of Discharge Process>

Next, a description will be given on another example of the discharge process executed by the microcomputer 30. Another example of the discharge process is basically the same as the aforementioned discharge process, but a part of the process is different. Specifically, in the aforementioned discharge process, when two or one battery blocks are used, the selected two or one battery blocks are continuously used. In contrast, in another example of the discharge process, when two or one battery block is used, two or one battery blocks to be used of the first, second and third battery blocks 20, 21, 22 are changed in accordance with specified conditions. The specified conditions are, for example, that a specified period of time has elapsed, a difference between a maximum value and a minimum value of capacities of the first, the second, the second battery blocks 20, 21, 22 is a prescribed capacity or less, and so on.

<4-1. First Block Switching Process>

Figure 16:
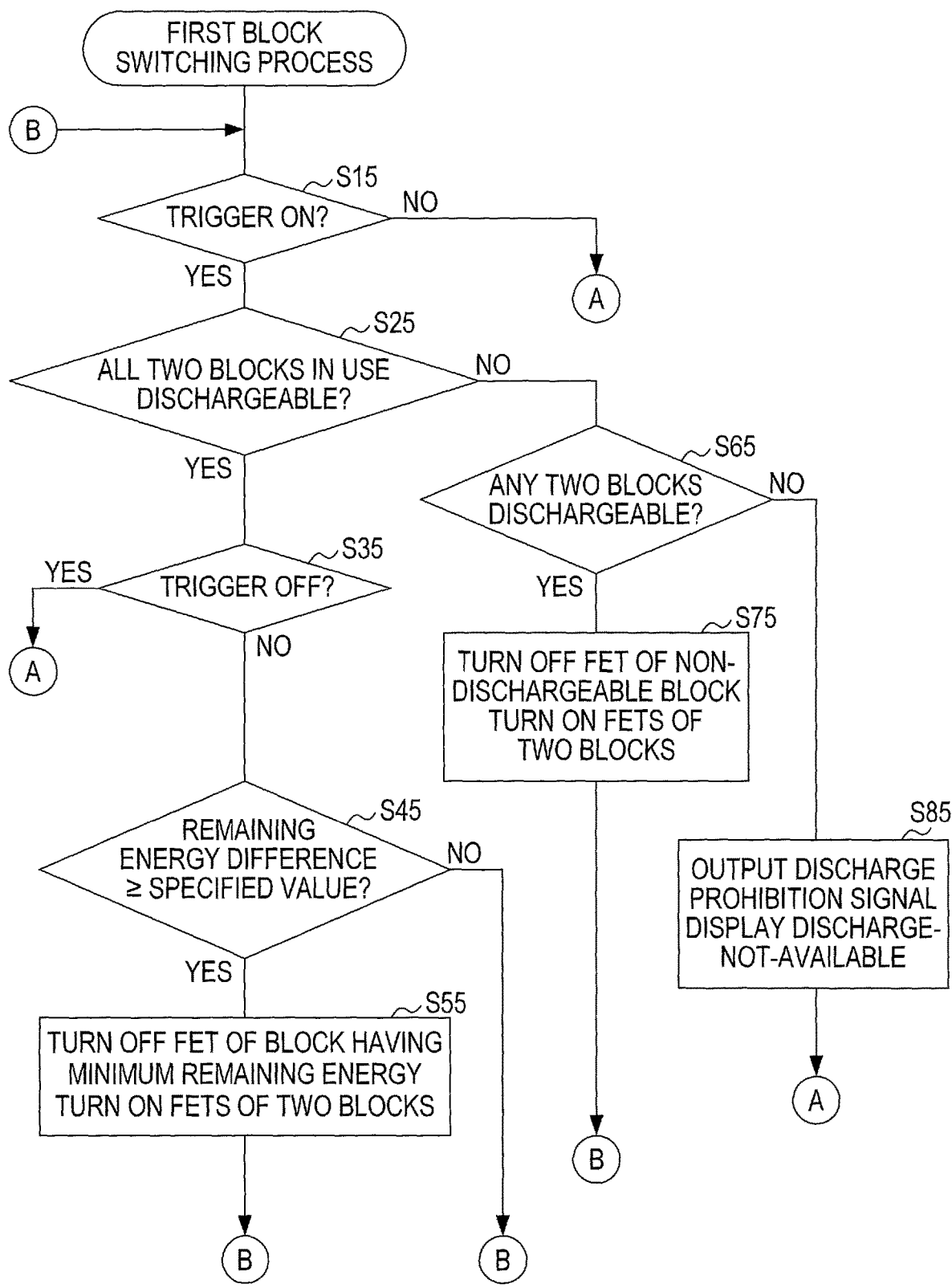
FIG. 16 is a flowchart of a first block switching process executed by the microcomputer of the battery pack according to the second embodiment.

Next, a description will be given on a first block switching process executed by the microcomputer 30 with reference to a flowchart of FIG. 16. The first block switching process is a process to use two battery blocks of the first, second and third battery blocks 20, 21, 22. The microcomputer 30 executes the flowchart shown in FIG. 16 instead of S200 to S230 and S480 to S510.

First, in S15, it is determined whether the trigger 2 is ON. When it is determined in S15 that the trigger 2 is ON, the process proceeds to S25. When it is determined that the trigger 2 is OFF, the process returns to S10.

In S25, it is determined whether both of the two battery blocks in use are dischargeable. When it is determined in S25 that both of the two battery blocks in use are dischargeable, the process proceeds to S35.

In S35, it is determined whether the trigger 2 is OFF. When it is determined in S35 that the trigger 2 is OFF, the process returns to S10. On the other hand, if it is determined in S35 that the trigger 2 is ON, then the process proceeds to S45.

In S45, it is determined whether the respective remaining energy differences between the first, second and third battery blocks 20, 21, 22 are equal to or greater than specified values. Specifically, it is determined whether the remaining energy difference between the first battery block 20 and the second battery block 21, the remaining energy difference between the first battery block 20 and the third battery block 22, and the remaining energy difference between the second battery block 21 and the third battery block 22 are equal to or greater than specified values.

When it is determined in S45 that all the remaining energy differences are smaller than the specified values, the process returns to S15. On the other hand, when it is determined in S45 that at least one of the remaining energy differences is equal to or greater than the specified value, the process proceeds to S55.

In S55, the protection FET corresponding to the battery block having a minimum remaining energy among the protection FETs 590, 591, 592 is turned off, and the protection FETs corresponding to the remaining two battery blocks are turned on. Thereafter, the process returns to S15.

Also, when it is determined in S25 that at least one of the two battery blocks in use is not dischargeable, the process proceeds to S65.

In S65, it is determined whether any two battery blocks of the first, second and third battery blocks 20, 21, 22 are dischargeable. For example, in S30, even if it is determined that one battery block is not dischargeable, the battery block may recover thereafter and become dischargeable. When it is determined in S65 that any two battery blocks are dischargeable, the process proceeds to S75. On the other hand, when it is determined in S65 that any two battery blocks are not dischargeable, the process proceeds to S85, and the same step as S120 is executed.

In S75, the protection FET corresponding to the one battery block that is not dischargeable among the protection FETs 590, 591, 592 is turned off, and the protection FETs corresponding to the two dischargeable battery blocks are turned on. Thereafter, the process returns to S15.

Figure 19:
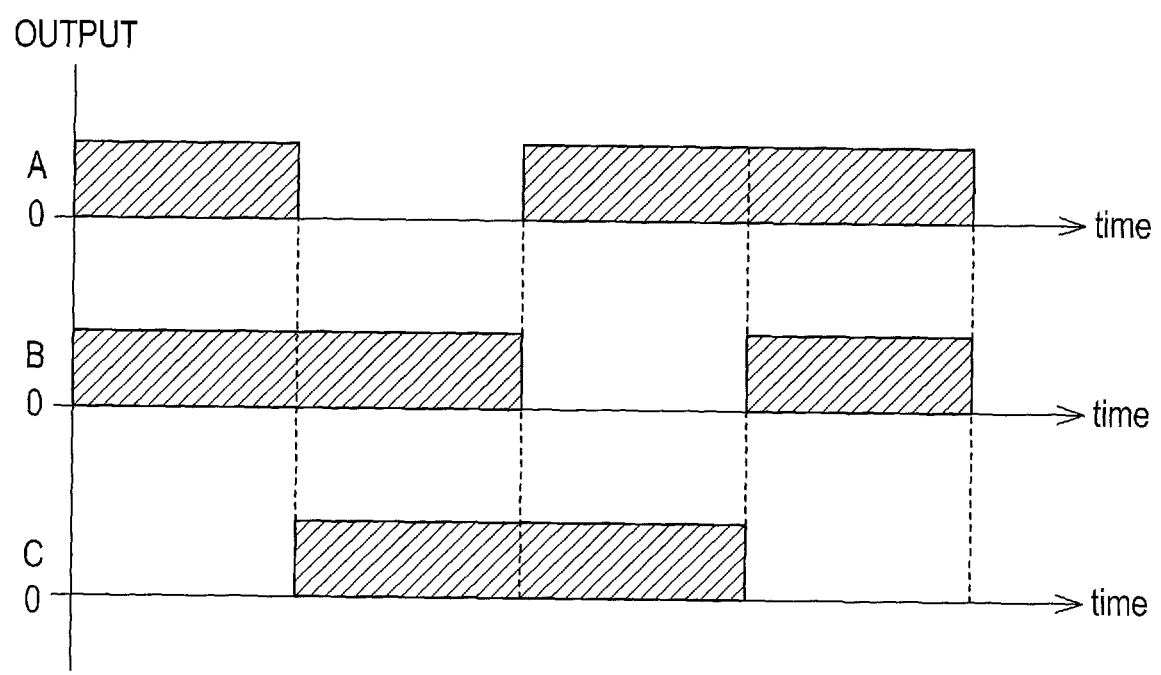
FIG. 19 is a time chart showing changes in outputs of the respective battery blocks, when two of the three battery blocks of the battery pack according to the second embodiment are used.

FIG. 19 shows a time variation of outputs of the respective battery blocks when the first block switching process is executed and discharges from two of the first, second and third battery blocks 20, 21, 22 are continued. As such, execution of the first block switching process switches the two battery blocks to be discharged in accordance with the specified conditions.

<4-2. Second Block Switching Process>

Figure 17:
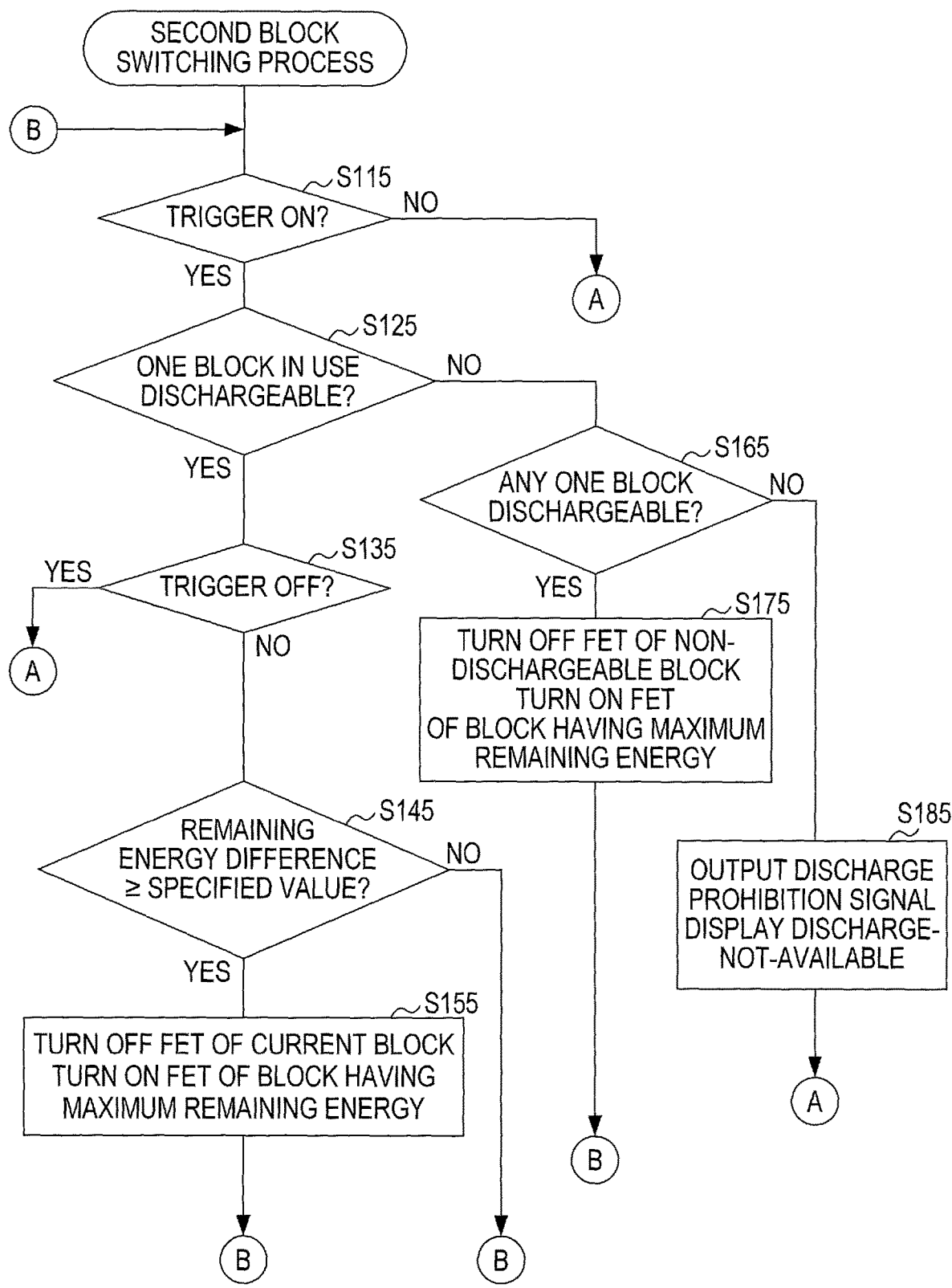
FIG. 17 is a flowchart of a second block switching process executed by the microcomputer of the battery pack according to the second embodiment.

Next, a description will be given on a second block switching process executed by the microcomputer 30 with reference to a flowchart of FIG. 17. The second block switching process is a process to use one of the first, second and third battery blocks 20, 21, 22. The microcomputer 30 executes the flowchart shown in FIG. 17, instead of S580 to S610 and S780 to S810.

First, in S115, it is determined whether the trigger 2 is ON. When it is determined in S115 that the trigger 2 is ON, the process proceeds to S125. When it is determined that the trigger 2 is OFF, the process returns to S10.

In S125, it is determined whether one battery block in use is dischargeable. When it is determined in S125 that the one battery block in use is dischargeable, the process proceeds to S135.

In S135, it is determined whether the trigger 2 is OFF. When it is determined in S135 that the trigger 2 is OFF, the process returns to S10. On the other hand, when it is determined in S135 that the trigger 2 is ON, the process proceeds to S145.

In S145, it is determined whether the respective remaining energy differences between the first, second and third battery blocks 20, 21, 22 are equal to or greater than the specified value. When it is determined in S145 that all the remaining energy differences are smaller than the specified value, the process returns to S115. On the other hand, when it is determined in S145 that at least one of the remaining energy differences is equal to or greater than the specified value, the process proceeds to S155.

In S155, the protection FET corresponding to the battery block currently in use of the protection FETs 590, 591, 592 is turned off. Then, the protection FET corresponding to the battery block having the maximum remaining energy of the dischargeable battery blocks is turned on. Thereafter, the process returns to S115.

When it is determined in S125 that the one battery block in use is not dischargeable, the process proceeds to S165.

In S165, it is determined whether any one of the first, second and third battery blocks 20, 21, 22 is dischargeable. When it is determined in S165 that any one battery block is dischargeable, the process proceeds to S175. On the other hand, when it is determined in S165 that none of the battery blocks is dischargeable, the process proceeds to S185, and the same step as S120 is executed.

In S175, the protection FET corresponding to the one battery block that is not dischargeable of the protection FETs 590, 591, 592 is turned off, and the protection FET corresponding to battery block having the maximum remaining energy of the dischargeable battery blocks is turned on. Thereafter, the process returns to S115.

Figure 20:
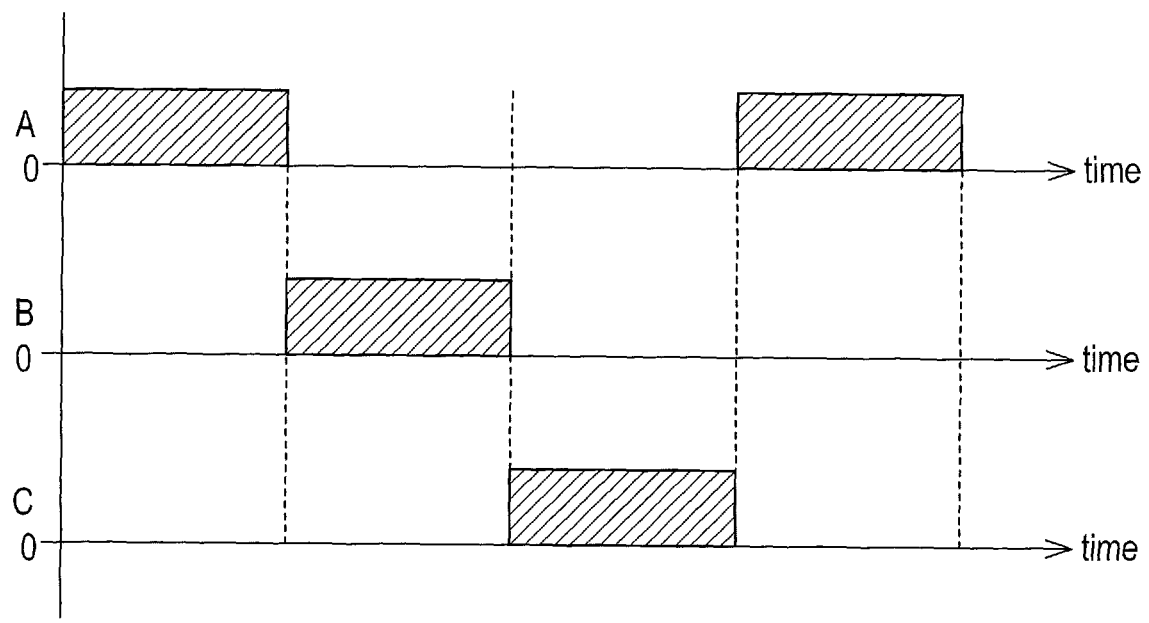
FIG. 20 is a time chart showing changes in outputs of the respective battery blocks, when one of the three battery blocks of the battery pack according to the second embodiment is used.

FIG. 20 shows a time variation of outputs of the first, second and third battery blocks 20, 21, 22 when the second block switching process is executed and a discharge from one of the first, second and third battery blocks 20, 21, 22 is continued. As such, execution of the second block switching process switches the one battery block to be discharged in accordance with the specified conditions.

<5. Effect>

According to the above-described second embodiment, effects as below are obtained, in addition to the effects (1) and (2) of the first embodiment.

(3) By setting the number of battery blocks of the first battery blocks 20, 21, 22 that conduct with the electric work machine 5 to be equal to or smaller than the maximum number determined in accordance with the electric work machine information, the impedance of the battery pack 10 can be within a range to which the electric work machine 5 is adaptable.

(4) The electric work machine information can be acquired by the communication with the electric work machine 5 via the second communication terminal TD, and, based on the acquired electric work machine information, the number of battery blocks corresponding to the electric work machine 5 can be selected. Further, the number of battery blocks corresponding to the electric work machine 5 can be made conducting with the electric work machine 5, and the remaining battery blocks can be made non-conducting with the electric work machine 5.

(5) Until selection of the battery block to conduct with the electric work machine 5 is completed, any one of the first, second and third battery blocks 20, 21, 22 conducts with the electric work machine 5. As a result, an electric power can be supplied from the battery pack 10 to the electric work machine 5 while the impedance of the battery pack 10 has a highest value. Further, the battery pack 5 can communicate with the electric work machine 5 and obtain the electric work machine information for selecting the battery block that conducts with the electric work machine 5.

(6) When an electric power is supplied to the electric work machine 5 from the maximum number of battery blocks permissible to the electric work machine 5, the first notification is executed. When an electric power is supplied from the battery blocks smaller than the maximum number to the electric work machine 5, the second notification which is distinct from the first notification is executed. This allows the user to recognize whether the electric work machine 5 is operating with a maximum electric power.

(7) When an electric power is supplied to the electric work machine 5 from the maximum number of battery blocks permissible to the electric work machine 5, the first command is outputted from the battery pack 10 to the electric work machine 5 so that the first notification is executed. When an electric power is supplied from the battery blocks smaller than the maximum number to the electric work machine 5, the second command is outputted from the battery pack 10 to the electric work machine 5 so that the second notification which is distinct from the first notification is executed. This allows the user using the electric work machine 5 to easily recognize whether the electric work machine 5 is operating with a maximum electric power via the device display 8 of the electric work machine 5 which the user is easy to be aware of.

(8) When discharge from any of the first, second and third battery blocks 20, 21, 22 is prohibited, a notification of discharge prohibition is given by the device display 8 and the battery indicator 11. This allows the user to be aware that the battery pack 10 is not available.

Other Embodiments

Although embodiments of the present disclosure have been described above, the present disclosure is not limited to the above-described embodiments and may be practiced in various forms.

Figure 21:
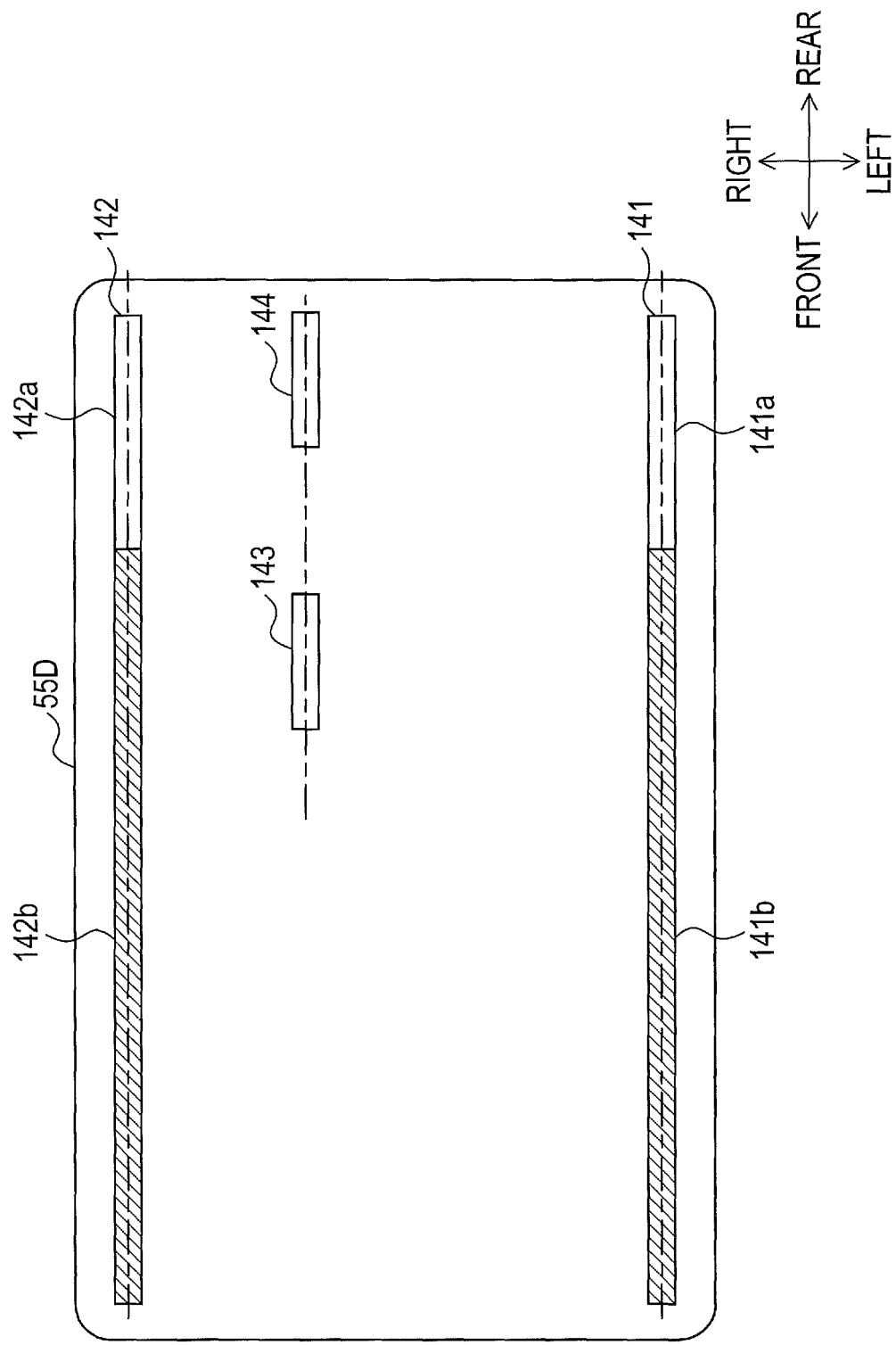
FIG. 21 is a schematic view showing another example configuration of an attachment portion of the third electric work machine according to the first embodiment.

(a) In the above-described embodiments, the battery pack 10 includes one balance circuit 50 between the first battery block 20 and the third battery block, but may include two balance circuits. For example, the battery pack 10 may include a balance circuit between the second battery block 21 and the third battery block 22, in addition to the balance circuit 50. In this case, the first electric work machine 5 may include an attachment surface 55D shown in FIG. 21, instead of the attachment surface 55A.

The attachment surface 55D includes a positive terminal 141, a negative terminal 142, a first work machine communication terminal 143, and a second work machine communication terminal 144. The first and second work machine communication terminals 143, 144 are similar terminals arranged at the same positions as the first and second work machine communication terminals 113, 114. The positive terminal 141 includes a rear positive electrode conduction portion 141a and a front positive electrode insulated portion 141b. The negative terminal 142 includes a rear negative electrode conduction portion 142a and a front negative electrode insulated portion 142b. The positive electrode conduction portion 141a and the positive electrode insulated portion 141b are adjacent to each other, and the negative electrode conduction portion 142a and the negative electrode insulated portion 142b are adjacent to each other.

Figure 22:
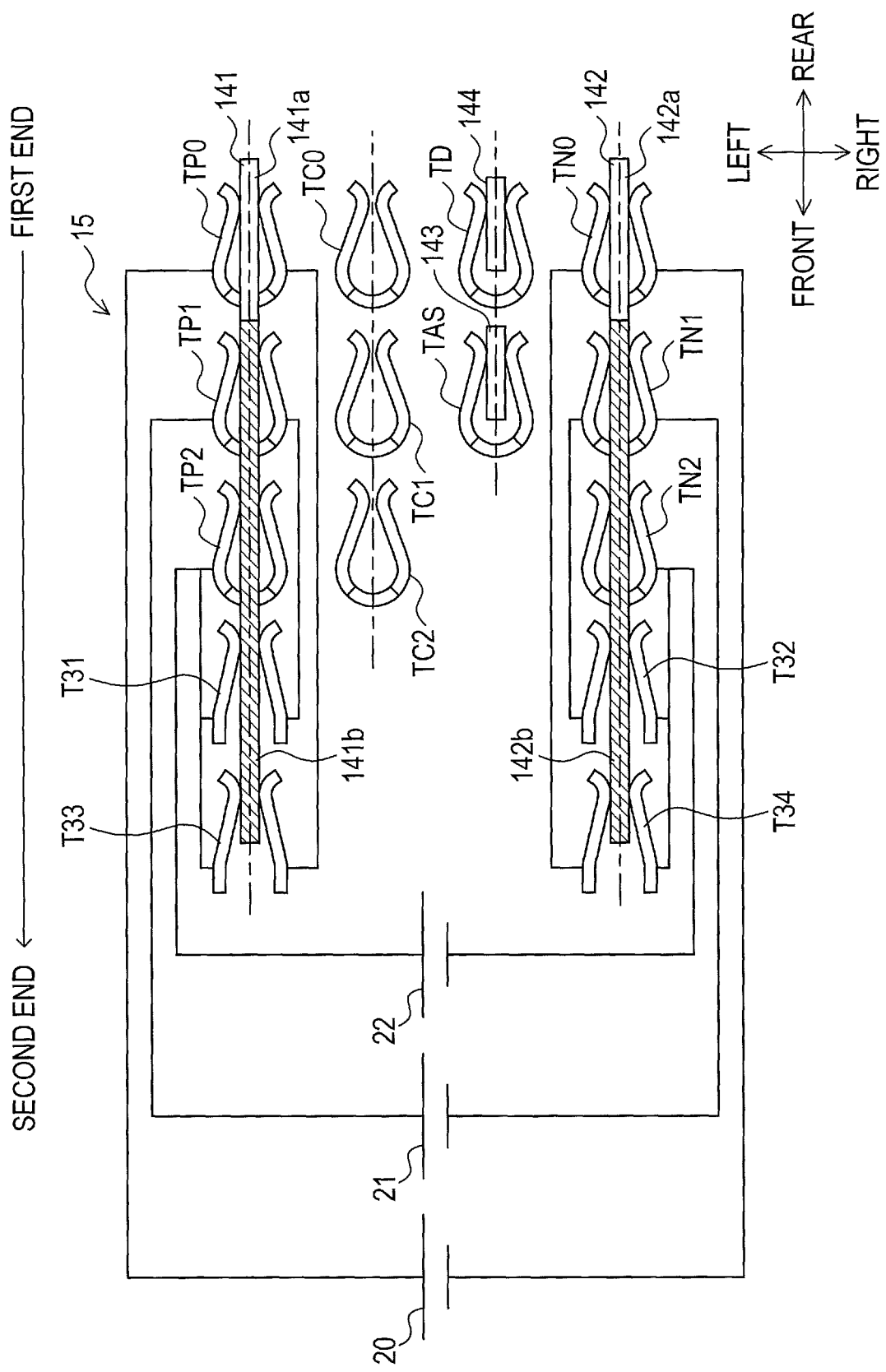
FIG. 22 is a schematic view showing a state in which another example of the attachment portion of the third electric work machine is attached to the connector of the battery pack according to the first embodiment.

As shown in FIG. 22, the positive terminal 141 is arranged at a position corresponding to the terminal row including the first battery positive terminal TP0, and the negative terminal 142 is arranged at a position corresponding to the terminal row including the first battery negative terminal TN0. The positive electrode conduction portion 141a is configured to have a length to penetrate the first battery positive terminal TP0, and not to be inserted to the second battery positive terminal TP1. The negative electrode conduction portion 142a is configured in the same manner as the positive electrode conduction portion 141a. Also, the positive electrode insulated portion 141b is configured to have a length to penetrate the second and third battery positive terminals TP1, TP2, the first parallel connection terminal T31, and the third parallel connection terminal 33. The negative electrode insulated portion 142b is configured in the same manner as the positive electrode insulated portion 141b.

As shown in FIG. 22, attachment of the battery pack 10 to the battery attachment 9 causes the positive electrode conduction portion 141a to conduct with the first battery positive terminal TP0. Also, the negative electrode conduction portion 142a conducts with the first battery negative terminal TN0.

Further, the first members T31a, T32a, T33a, T34a of the first, second, third, and fourth parallel connection terminals T31, T32, T33, T34 are electrically disconnected from the second members T31b, T32b, T33b, T34b. Specifically, the first battery block 20, the second battery block 21, and the third battery block 22 are electrically disconnected from each other. However, the remaining energies of the first battery block 20 and the third battery block 22 are equalized by the balance circuit 50, and the remaining energies of the second battery block 21 and the third battery block 22 are equalized by another balance circuit. Accordingly, the remaining energies of the first, second and third battery blocks 20, 21, 22 can be equalized.

(b) In the above-described embodiments, the device display 8 and the battery indicator 11 display the output state in accordance with the number of battery blocks used with respect to the maximum number permissible to the electric work machine 5. In contrast, the device display 8 and the battery indicator 11 may display the output state in accordance with the number of battery blocks used, regardless of the maximum number permissible to the electric work machine 5. Specifically, in a case in which the electric work machine 5 uses three of the first, second and third battery blocks 20, 21, 22, the device display 8 and the battery indicator 11 may display "high power output". Also, in a case in which the electric work machine 5 uses two of the first, second and third battery blocks 20, 21, 22, the device display 8 and the battery indicator 11 may display "medium power output". In a case in which the electric work machine 5 uses one battery block, the device display 8 and the battery indicator 11 may display "low power output".

(c) In the above-described embodiments, both the device display 8 and the battery indicator 11 display the output and discharge-not-available, but only one of them may display the output and discharge-not-available. Also, either of the device display 8 or the battery indicator 11 may not be provided.

(d) The number of battery blocks included in the battery pack 10 is not limited to three, and may be two, four or more.

(e) The microcomputer 30 may include, in place of or in addition to the microcomputer 30, a combination of various individual electronic components, an ASIC (Application Specified Integrated Circuit), an Application Specific Standard Product (ASSP), a programmable logic device such as, for example, Field Programmable Gate Array (FPGA), or a combination of the foregoing.

(f) Two or more functions of one element in the aforementioned embodiments may be achieved by two or more elements; or one function of one element in the aforementioned embodiments may be achieved by two or more elements. Likewise, two or more functions of two or more elements may be achieved by one element; or one function achieved by two or more elements may be achieved by one element. A part of the configuration of the aforementioned embodiments may be omitted; and at least a part of the configuration of the aforementioned embodiments may be added to or replaced with another part of the configuration of the aforementioned embodiments.

(g) The present disclosure can be also implemented in various modes, such as an electric work machine system including the battery pack as an element, a program to cause a microcomputer of the battery pack to function, a non-transitory tangible storage medium such as a semiconductor memory storing this program, and so on, in addition to the above-described battery pack.

The invention claimed is:

1. A battery pack comprising:
two or more battery blocks each having a positive electrode and a negative electrode; and
a connection circuit configured to be connected to a positive terminal and a negative terminal of an electric work machine, the connection circuit being configured to connect the positive terminal and the negative terminal to a specific number of battery blocks included in the two or more battery blocks, and the specific number depending on electrical properties of the electric work machine, the electric work machine having a work machine communication terminal configured to transmit a machine information that specifies the electrical properties,
the connection circuit including:
a battery communication terminal configured to be connected to the work machine communication terminal and receive the machine information transmitted from the work machine communication terminal, and
a controller located in the battery pack and connected to the battery communication terminal,
the controller being configured to:
select the specific number of battery blocks from the two or more battery blocks, based on the machine information that is input from the work machine via the work machine communication terminal and the battery communication terminal,
connect the positive electrode of each of the specific number of battery blocks to the positive terminal via the connection circuit,
connect the negative electrode of each of the specific number of battery blocks to the negative terminal via the connection circuit, and
disconnect the positive electrode or the negative electrode of each remaining battery block of the two or more battery blocks from the positive terminal or the negative terminal via the connection circuit.

2. The battery pack according to claim 1, wherein
the specific number is equal to or smaller than a number of battery blocks permissible depending on the electrical properties.

3. The battery pack according to claim 1, wherein
the controller is further configured to:
connect the positive electrode and the negative electrode of one of the two or more battery blocks to the positive terminal and the negative terminal respectively via the connection circuit until selection of the specific number of battery blocks is completed.

4. The battery pack according to claim 1 further comprising:
a notifier, wherein
the controller is further configured to execute:
a first notification via the notifier in response to the specific number being consistent with a number of battery blocks permissible depending on the electrical properties; and
execute a second notification via the notifier in response to the specific number being smaller than the number, the second notification being distinct from the first notification.

5. The battery pack according to claim 1, wherein
the controller is further configured to:
transmit a first command for execution of a first notification to the electric work machine via the battery communication terminal in response to the specific number being consistent with a number of battery blocks permissible depending on the electrical properties; and
transmit a second command for execution of a second notification, which is distinct from the first notification, to the electric work machine via the battery communication terminal in response to the specific number being smaller than the number.

6. The battery pack according to claim 1 further comprising:
a notifier, wherein
the controller is further configured to execute:
a discharge prohibition notification via the notifier in response to prohibiting discharge from all of the two or more battery blocks.

7. The battery pack according to claim 1, wherein
the two or more battery blocks include a first battery block, a second battery block, and a third battery block,
the electric work machine includes a first electric work machine having the electrical properties that a number of battery blocks permissible is one,
the connection circuit further includes
one balance circuit connected between the first battery block and the third battery block, the balance circuit being configured to balance a capacity of the first battery block and a capacity of the third battery block,
the positive electrode and the negative electrode of the first battery block are configured to be respectively connected to the positive terminal and the negative terminal via the connection circuit in response to the battery pack being attached to the first electric work machine,
the positive electrode of the second battery block is configured to be connected to the positive electrode of the third battery block via the connection circuit in response to the battery pack being attached to the first electric work machine,
the negative electrode of the second battery block is configured to be connected to the negative electrode of the third battery block via the connection circuit in response to the battery pack being attached to the first electric work machine.

8. A method executed by a controller located in a battery pack and connected to a battery communication terminal of the battery pack, the method comprising:
receiving a machine information via the battery communication terminal and a work machine communication terminal of a work machine, the work machine communication terminal being configured to be connected to the battery communication terminal and transmit the machine information, the machine information specifying electrical properties;
selecting a specific number of battery blocks from two or more battery blocks included in the battery pack, based on the machine information that is input from the work machine via the work machine communication terminal and the battery communication terminal, the specific number of battery blocks depending on the electrical properties of the work machine;
connecting a positive terminal of an electric work machine to a positive electrode of each of the specific number of battery blocks;
connecting a negative terminal of the electric work machine to a negative electrode of each of the specific number of battery blocks; and
disconnecting the positive electrode or the negative electrode of each remaining battery block of the two or more battery blocks from the positive terminal or the negative terminal.

* * * * *